United States Patent
Omori

(10) Patent No.: US 9,568,042 B2
(45) Date of Patent: Feb. 14, 2017

(54) RADIAL FOIL BEARING

(71) Applicant: IHI Corporation, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 86 days.

(21) Appl. No.: 14/596,392

(22) Filed: Jan. 14, 2015

(65) Prior Publication Data

US 2016/0010682 A1    Jan. 14, 2016

Related U.S. Application Data

(63) Continuation of application No. PCT/JP2013/069444, filed on Jul. 17, 2013.

(30) Foreign Application Priority Data

Jul. 18, 2012    (JP) .................................. 2012-159696

(51) Int. Cl.
    *F16C 32/06*    (2006.01)
    *F16C 17/02*    (2006.01)
    (Continued)

(52) U.S. Cl.
    CPC .............. *F16C 17/024* (2013.01); *F16C 27/02* (2013.01); *F16C 43/02* (2013.01)

(58) Field of Classification Search
    CPC ......... F16C 17/02; F16C 17/024; F16C 17/24; F16C 27/02; F16C 32/060306; F16C 33/08; F16C 43/02; F16C 2226/70; F16C 2226/76
    See application file for complete search history.

(56) References Cited

U.S. PATENT DOCUMENTS

| 4,133,585 A | 1/1979 | Licht |
| 4,295,689 A | 10/1981 | Licht |

(Continued)

FOREIGN PATENT DOCUMENTS

| CN | 1898476 A | 1/2007 |
| JP | S60-175914 U | 11/1985 |

(Continued)

OTHER PUBLICATIONS

PCT Written Opinion of the International Searching Authority for PCT Patent Application No. PCT/JP2013/069444 mailed on Oct. 22, 2013, 4 pages.

(Continued)

*Primary Examiner* — James Pilkington
(74) *Attorney, Agent, or Firm* — Amster, Rothstein & Ebenstein LLP

(57) ABSTRACT

The radial foil bearing includes: a top foil disposed facing a rotary shaft; an intermediate foil disposed outside of the top foil in the radial direction thereof; a back foil disposed outside of the intermediate foil in the radial direction; and a cylindrical bearing housing accommodating the top foil, the intermediate foil and the back foil. Engagement recesses are formed on both side surfaces of the bearing housing so as to be opposite to each other. The intermediate foil includes intermediate foil pieces disposed in the circumferential direction of the bearing housing. An engagement-projecting piece engaging with the engagement recess is formed in each intermediate foil piece.

10 Claims, 12 Drawing Sheets

(51) Int. Cl.
*F16C 27/02* (2006.01)
*F16C 43/02* (2006.01)

(56) References Cited

U.S. PATENT DOCUMENTS

| | | | |
|---|---|---|---|
| 4,552,466 | A | 11/1985 | Warren |
| 4,815,864 | A | 3/1989 | Jones |
| 4,850,721 | A | 7/1989 | Malabre et al. |
| 5,634,723 | A | 6/1997 | Agrawal |
| 5,902,049 | A | 5/1999 | Heshmat |
| 5,915,841 | A | 6/1999 | Weissert |
| 6,135,640 | A | 10/2000 | Nadjafi |
| 7,553,086 | B2 * | 6/2009 | Kang ............... F16C 17/024 384/103 |
| 8,353,631 | B2 * | 1/2013 | Kim ................ F16C 17/024 384/103 |
| 2003/0012466 | A1 | 1/2003 | Shimizu et al. |
| 2005/0185865 | A1 | 8/2005 | Agrawal |
| 2007/0069567 | A1 * | 3/2007 | Chen ................ B60N 2/28 297/411.36 |
| 2008/0205803 | A1 | 8/2008 | Kato et al. |
| 2011/0052110 | A1 * | 3/2011 | Kim ................ F16C 17/024 384/106 |
| 2014/0147064 | A1 * | 5/2014 | Omori ............... F16C 35/02 384/103 |
| 2014/0169708 | A1 | 6/2014 | Omori |
| 2014/0241653 | A1 * | 8/2014 | Omori ............... F16C 17/024 384/106 |
| 2015/0159689 | A1 | 6/2015 | Omori |

FOREIGN PATENT DOCUMENTS

| | | |
|---|---|---|
| JP | H01-145418 A | 6/1989 |
| JP | 2002-061645 A | 2/2002 |
| JP | 2002-372042 A | 12/2002 |
| JP | 2003-056561 A | 2/2003 |
| JP | 2003-074550 A | 3/2003 |
| JP | 2004-190762 A | 7/2004 |
| JP | 2004-270904 A | 9/2004 |
| JP | 2005-233427 A | 9/2005 |
| JP | 2006-057652 A | 3/2006 |
| JP | 2006-057828 A | 3/2006 |
| JP | 2008-200823 A | 9/2008 |
| JP | 2009-299748 A | 12/2009 |
| JP | 2011-017385 A | 1/2011 |
| JP | 2011-033176 A | 2/2011 |
| JP | 2011-144846 A | 7/2011 |
| JP | 2013-024344 A | 2/2013 |
| JP | 2013-032799 A | 2/2013 |
| JP | 2013-087789 A | 5/2013 |
| JP | 2013-100885 A | 5/2013 |
| JP | 2013-217425 A | 10/2013 |
| WO | 2013/015098 A1 | 1/2013 |
| WO | 2013/024674 A1 | 2/2013 |

OTHER PUBLICATIONS

International Search Report received for PCT Patent Application No. PCT/JP2013/069444 mailed on Oct. 22, 2013, 4 pages (2 pages of English Translation and 2 pages of PCT search report).

* cited by examiner

RADIAL FOIL BEARING

CROSS-REFERENCE TO RELATED APPLICATIONS

This application is a Continuation application based on International Application No. PCT/JP2013/069444, filed Jul. 17, 2013, which claims priority on Japanese Patent Application No. 2012-159696, filed Jul. 18, 2012, the contents of both of which are incorporated herein by reference.

TECHNICAL FIELD

The present invention relates to a radial foil bearing.

BACKGROUND ART

In the related art, as a bearing used for a high-speed rotating body, a radial bearing is known which is used in a state of being attached to a rotary shaft so as to encircle the shaft. As such a radial bearing, a radial foil bearing is well known, including a thin sheet-like top foil which forms a bearing surface, a back foil which elastically supports the top foil, and a cylindrical bearing housing which accommodates the top foil and the back foil. As the back foil of the radial foil bearing, a bump foil is mainly used in which a thin sheet is formed in a wave sheet shape.

In some foil bearings, for example, in order to improve the damping effect by friction between foils or to increase the rigidity of the top foil, an intermediate foil is inserted between the top foil and the back foil (refer to Patent Document 1).

In such a radial foil bearing, in general, in order to prevent the detachment of the top foil or the bump foil from the bearing housing, one end portion (toe portion) thereof is directly fixed to the bearing housing or is indirectly fixed thereto via a spacer, using spot welding. Additionally, in general, the intermediate foil is disposed on the entire circumference of the bearing housing similar to the top foil or to the bump foil, and one end portion thereof is also fixed to the bearing housing through welding.

In addition, in order to perform mechanical fixing instead of welding, a radial foil bearing is also known, having a structure in which an end portion of a top foil or of a back foil (bump foil) is bent through bending machining and in which the bent portion is engaged with an engagement groove formed in a bearing housing (refer to Patent Documents 2 to 4).

DOCUMENT OF RELATED ART

Patent Document

[Patent Document 1] U.S. Pat. No. 5,902,049
[Patent Document 2] Japanese Unexamined Patent Application, First Publication No. 2011-033176
[Patent Document 3] Japanese Unexamined Patent Application, First Publication No. 2011-017385
[Patent Document 4] Japanese Unexamined Patent Application, First Publication No. 2002-061645

SUMMARY OF INVENTION

Technical Problem

However, if the fixing of the back foil (bump foil) to the bearing housing is performed through welding, the back foil or the bearing housing may be deformed because heat of the welding is applied thereto, and due to this effect, distortion may occur in the top foil. Similarly, if the fixing of the intermediate foil is performed through welding, distortion may also occur in the top foil. That is, when distortion occurs in the intermediate foil due to welding, the distortion of the intermediate foil is reflected in the top foil which is disposed on the intermediate foil, and thus distortion may occur in the top foil. In addition, even if the top foil and the intermediate foil overlapping with each other are welded at the same time, the distortion of the intermediate foil composing a lower layer is reflected in the top foil, and thus the amount of distortion of the top foil may be increased.

In radial foil bearings disclosed in Patent Documents 2 to 4, since bending machining is performed on a top foil or on a back foil, distortion may occur in the top foil. That is, although distortion may occur in both of the top foil and the back foil due to the bending machining thereof, since the back foil supports the top foil, the distortion of the back foil is reflected in the top foil, and thus the distortion of the top foil may be further increased.

The thickness of a fluid lubrication film of a foil bearing, which is formed between the rotary shaft and the top foil through the rotation of the rotary shaft, is extremely thin such as about 10 μm. Therefore, even if slight distortion occurs in the top foil, the load capability or the dynamic characteristics (the rigidity and the damping performance) of the bearing is influenced, and the designed performance thereof may not be obtained.

In the related art, when the intermediate foil is employed, the intermediate foil is disposed on the entire circumference of the bearing housing. However, if the intermediate foil is disposed on the entire circumference, the restraint area due to friction between the intermediate foil and the back foil or between the intermediate foil and the top foil is increased, and thus a slide therebetween does not easily occur. However, if the slide does not easily occur in this way, the dumping effect by the friction caused by the slide may deteriorate.

The present invention was made in view of the above circumstances, and an object thereof is to provide a radial foil bearing in which by sufficiently decreasing distortion occurring in a top foil, the designed favorable performance can be obtained with respect to the load capability and the dynamic characteristics (the rigidity and the damping performance) of the bearing, and in which the damping effect can be improved using the friction between foils.

Solution to Problem

According to a first aspect of the present invention, a radial foil bearing used for supporting a rotary shaft so as to encircle the rotary shaft, the radial foil bearing includes: a cylindrical top foil disposed so as to face the rotary shaft; an intermediate foil disposed outside of the top foil in a radial direction thereof; a back foil disposed outside of the intermediate foil in the radial direction; and a cylindrical bearing housing accommodating the top foil, the intermediate foil and the back foil. A plurality of pairs of engagement recesses are formed in the bearing housing, each pair of engagement recesses are positioned on both side surfaces of the bearing housing, each engagement recess extends from an inner circumferential surface toward an outer circumferential surface of the bearing housing, and the plurality of pairs of engagement recesses are disposed in a circumferential direction of the bearing housing. The intermediate foil includes intermediate foil pieces disposed in the circumferential direction of the bearing housing. In addition, an engagement-projecting piece engaging with the engagement recess is formed in each intermediate foil piece.

In the radial foil bearing, the intermediate foil is composed of the intermediate foil pieces disposed in the circumferential direction of the bearing housing. Therefore, compared to a case where an intermediate foil composed of one foil is disposed on the entire circumference of the bearing housing, the restraint area due to friction between foils decreases, and a slide between each intermediate foil piece and the back foil or between each intermediate foil piece and the top foil easily occurs. Thus, the damping effect by the friction caused by the slide is improved.

The engagement-projecting piece formed in the intermediate foil piece is engaged with the engagement recess formed on each of both side surfaces of the bearing housing. Therefore, without performing spot welding or large bending on each intermediate foil piece, the intermediate foil composed of the intermediate foil pieces can be accommodated in and fixed to the bearing housing. Thus, the occurrence of distortion of the top foil due to spot welding of the intermediate foil or due to the distortion of the intermediate foil is prevented, and the distortion of the top foil is sufficiently decreased. In addition, since welding of the intermediate foil is unnecessary, assembly failures or assembly variations due to welding defects can be eliminated. Furthermore, when the intermediate foil piece is damaged or wasted, without replacing the entire intermediate foil, it is sufficient to replace only a damaged or wasted part (the intermediate foil piece) with a new one.

According to a second aspect of the present invention, in the first aspect, the back foil includes back foil pieces disposed in the circumferential direction of the bearing housing. In addition, the engagement-projecting piece of the intermediate foil piece engages with the engagement recess through a gap formed between the back foil pieces.

Since the back foil elastically supports the top foil via the intermediate foil, when receiving a load from the top foil, the back foil is deformed in the circumferential direction thereof, and thereby, accepts the flexure of the top foil and supports it. However, when the back foil is deformed in the circumferential direction, since the back foil receives influence of friction with the bearing housing, although a portion near the free end thereof is easily deformed, a portion near the fixed end thereof is not easily deformed. Therefore, a difference in support rigidity occurs between a portion near the free end and a portion near the fixed end, and a uniform support rigidity of the whole bearing may not be easily obtained.

According to the second aspect of the present invention, since the back foil is composed of the back foil pieces disposed in the circumferential direction of the bearing housing, the distance between the fixed end and the free end of the back foil piece decreases, and the difference in support rigidity between a portion near the free end and a portion near the fixed end decreases. Thus, the variation in the support rigidity of the entire back foil decreases.

Since the back foil is composed of the back foil pieces in the above way, by inserting the engagement-projecting piece of the intermediate foil piece into a gap formed between the back foil pieces, it is possible to easily engage the engagement-projecting piece with the engagement recess.

According to a third aspect of the present invention, in the first aspect, an engagement groove is formed in the inner circumferential surface of the bearing housing between the engagement recesses opposite to each other, the engagement groove communicates with each of the engagement recesses, and the depth of the engagement groove toward the outer circumferential surface of the bearing housing is less than that of the engagement recess. A locking member is locked in the engagement recesses and in the engagement groove. The locking member includes a pair of engagement arms engaging with the engagement recesses, and a connection portion engaging with the engagement groove and connecting the pair of engagement arms. Engagement projections are provided in portions of the pair of engagement arms opposite to portions thereof engaging with the engagement recesses, and each engagement projection projects from the inner circumferential surface of the bearing housing. An engagement notch engaging with the engagement projection is formed on each of both side edges of the back foil. In addition, the engagement-projecting piece of the intermediate foil piece engages with the engagement recess through the engagement notch of the back foil.

In this way, the engagement notch formed on each of both side edges of the back foil is engaged with the engagement projection formed on each of both side ends of the inner circumferential surface of the bearing housing, whereby the back foil can be fixed to the bearing housing. That is, without performing spot welding or bending machining on the back foil, the back foil can be accommodated in and fixed to the bearing housing. Thus, the occurrence of distortion of the top foil due to spot welding of the back foil or due to the distortion of the back foil is prevented, and the distortion of the top foil is sufficiently decreased. In addition, since welding of the back foil is unnecessary, assembly failures or assembly variations due to welding defects can be eliminated.

Since the engagement-projecting piece of the intermediate foil piece is engaged with the engagement recess through the engagement notch of the back foil, it is possible to easily engage the engagement-projecting piece with the engagement recess.

Since the engagement arm of the locking member and the engagement-projecting piece of the intermediate foil piece are together engaged with the engagement recess, compared to a case where portions, with which the engagement arm and the engagement-projecting piece engage, are separately formed, the number of steps of machining on the bearing housing can be decreased.

According to a fourth aspect of the present invention, in the first aspect, an engagement notch communicating with the engagement recess is formed on each of both side edges of the back foil. In addition, the engagement-projecting piece of the intermediate foil piece engages with the engagement recess through the engagement notch of the back foil.

In this way, by engaging the engagement-projecting piece of the intermediate foil piece with the engagement recess, not only the intermediate foil piece but also the back foil can be fixed to the bearing housing.

Since the back foil is fixed to the bearing housing using the intermediate foil piece in the above way, without performing spot welding or bending machining on the back foil, the back foil can be accommodated in and fixed to the bearing housing. Thus, the occurrence of distortion of the top foil due to spot welding of the back foil or due to the distortion of the back foil is prevented, and the distortion of the top foil is sufficiently decreased. In addition, since welding of the back foil is unnecessary, assembly failures or assembly variations due to welding defects can be eliminated.

According to a fifth aspect of the present invention, in the third or fourth aspect, the back foil includes back foil pieces disposed in the circumferential direction of the bearing housing. In addition, the engagement notch is formed in each back foil piece.

In this way, the distance between the fixed end and the free end of the back foil piece decreases, and the above-described difference in support rigidity between a portion near the free end and a portion near the fixed end decreases. Thus, the variation in support rigidity of the entire back foil decreases.

Since the engagement notch is formed in each back foil piece, by inserting the engagement-projecting piece of the intermediate foil piece into the engagement notch, it is possible to easily engage the engagement-projecting piece with the engagement recess.

According to a sixth aspect of the present invention, in the fifth aspect, the engagement notch of the back foil piece is formed in a circumferentially center portion of the back foil piece.

In this way, the difference in support rigidity between a portion near the free end and a portion near the fixed end of each back foil piece further decreases, and thus the variation in support rigidity of the entire back foil further decreases.

According to a seventh aspect of the present invention, in any one of the first to sixth aspects, intermediate foils are disposed overlapping with each other.

In this way, the damping effect obtained through friction caused by a slide between the intermediate foils is added, and thus the damping effect of the radial foil bearing is further improved.

Effects of Invention

According to a radial foil bearing of the present invention, an intermediate foil is composed of intermediate foil pieces disposed in the circumferential direction of a bearing housing. Therefore, a slide between each intermediate foil piece and a back foil or between each intermediate foil piece and a top foil can easily occur, and thus, the damping effect using friction caused by the slide can be improved.

In addition, without performing spot welding or large bending on each intermediate foil piece, the intermediate foil is accommodated in and fixed to the bearing housing. Therefore, the occurrence of distortion of the top foil due to the distortion of the intermediate foil can be prevented. Thus, the distortion of the top foil can be sufficiently decreased, and thereby, with respect to the load capability or the dynamic characteristics (the rigidity and the damping performance) of the bearing, the designed favorable performance can be obtained.

DESCRIPTION OF EMBODIMENTS

Figure 1:
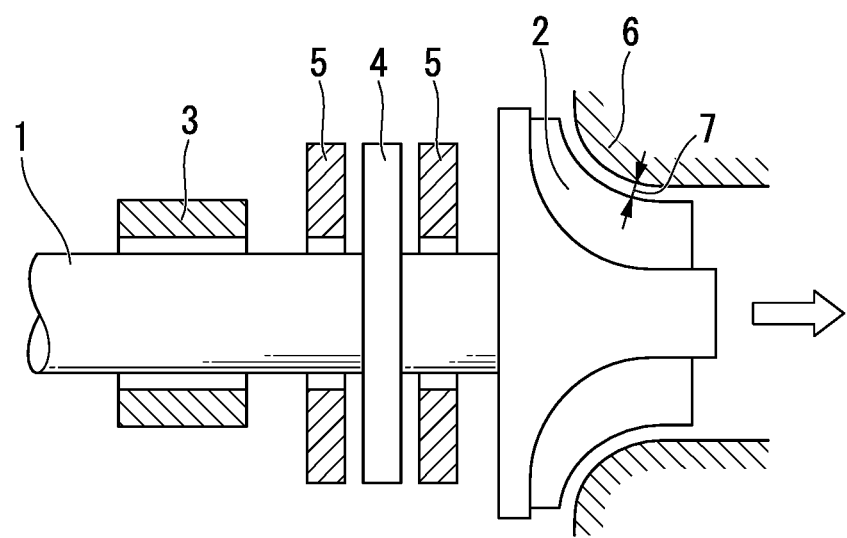
FIG. 1 is a schematic view showing an example of a turbo machine in which a radial foil bearing according to the present invention is provided.

Hereinafter, a radial foil bearing of the present invention is described in detail with reference to the drawings. In the drawings below, in order to show each member in a recognizable size, the scale of each member is appropriately changed.

FIG. 1 is a side view showing an example of a turbo machine in which a radial foil bearing of the present invention is provided. In FIG. 1, a reference numeral 1 represents a rotary shaft, a reference numeral 2 represents an impeller provided in the tip portion of the rotary shaft, and a reference numeral 3 represents a radial foil bearing according to the present invention. In addition, in FIG. 1, only one radial foil bearing is shown, and another radial foil bearing is omitted. However, in general, two radial foil bearings are provided in the axial direction of the rotary shaft 1, thereby configuring the support structure for the rotary shaft 1. Accordingly, although not shown, two radial foil bearings 3 are also provided in this embodiment.

A thrust collar 4 is fixed to the rotary shaft 1 near the position at which the impeller 2 is formed, and thrust bearings 5 are disposed at both sides of the thrust collar 4 so as to face the thrust collar 4.

The impeller 2 is disposed inside a housing 6 which is a stationary side, and a tip clearance 7 is formed between the impeller 2 and the housing 6.

The radial foil bearing 3 is attached to the rotary shaft 1 at a position nearer the center of the rotary shaft 1 than the thrust collar 4 so as to encircle the rotary shaft 1.

First Embodiment

Figure 2A:
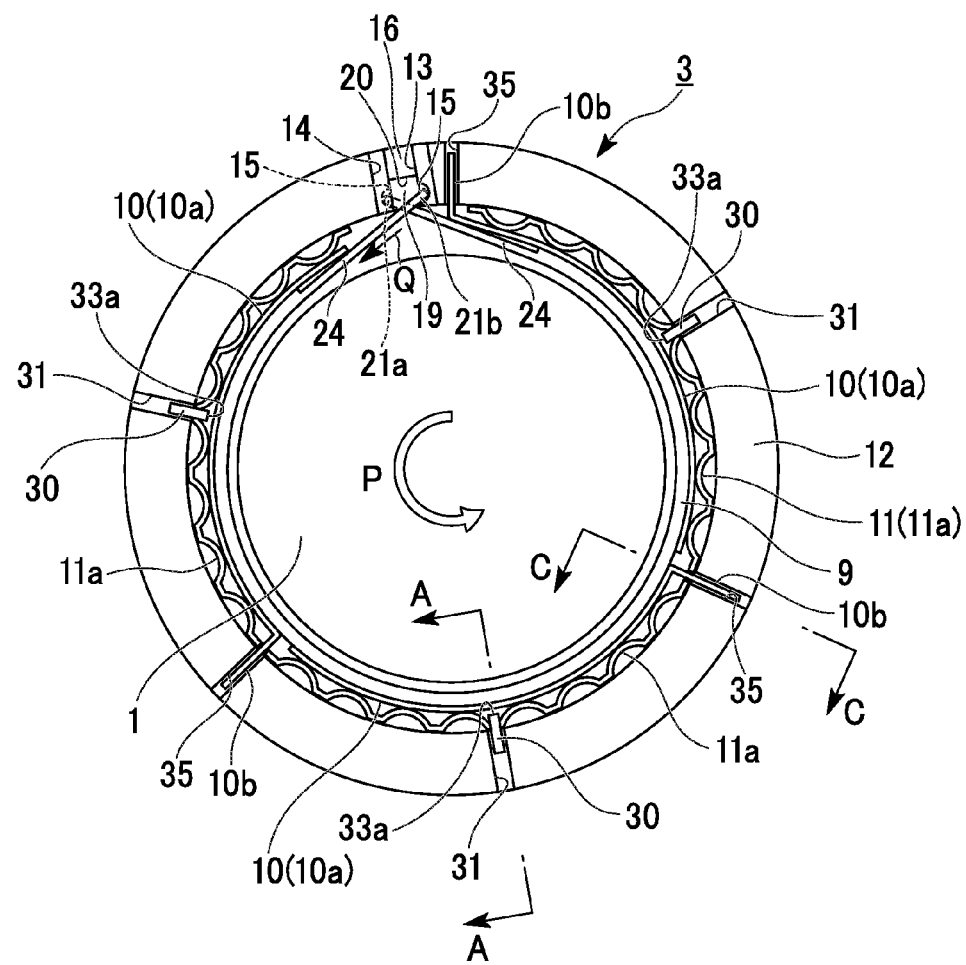
FIG. 2A is a side view of a radial foil bearing of a first embodiment of the present invention.
Figure 2B:
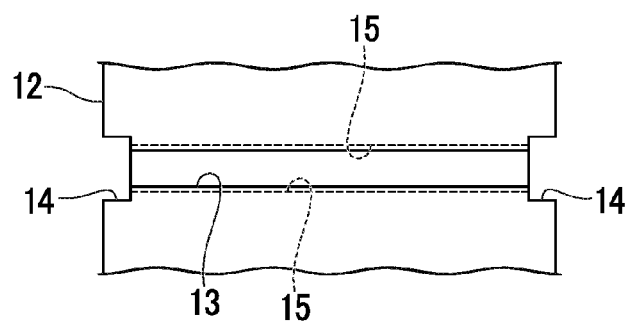
FIG. 2B is a schematic view showing a main section of an inner circumferential surface of a bearing housing.

FIGS. 2A and 2B are views showing a first embodiment of a radial foil bearing provided in the turbo machine having the above configuration. As shown in FIG. 2A, a radial foil bearing 3 of the first embodiment is a cylindrical device which encircles the rotary shaft 1 and which supports the rotary shaft 1. The radial foil bearing 3 includes a cylindrical top foil 9 disposed facing the rotary shaft 1, an intermediate foil 10 disposed outside of the top foil 9 in the radial direction thereof, a back foil 11 disposed outside of the intermediate foil 10 in the radial direction, and a bearing housing 12 disposed outside of the back foil 11 in the radial direction.

The bearing housing 12 is a cylindrical metal member composing the outermost portion of the radial foil bearing 3 and accommodates the back foil 11, the intermediate foil 10 and the top foil 9 at the inside thereof. The bearing housing 12 has a through groove 13 which is formed in the inner circumferential surface of the bearing housing 12 in the axial direction thereof. That is, as shown in FIG. 2B showing a main section of the inner circumferential surface of the bearing housing 12, the through groove 13 is formed in the inner circumferential surface of the bearing housing 12 continuously from one end to the other end in the axial direction of the bearing housing 12 on the entire length thereof. The through groove 13 is formed so that the length thereof is the same as the length (axially length) of the bearing housing 12, the opening width thereof is about 3 to 5 mm, and the depth thereof is about 1.5 to 2.5 mm.

Figure 3A:
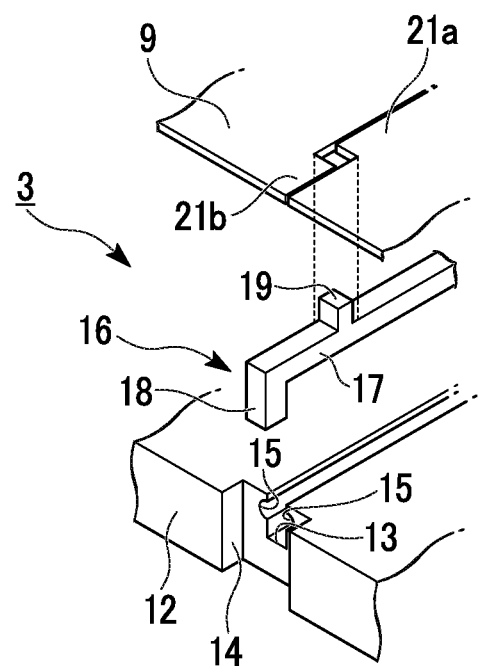
FIG. 3A is an exploded perspective view of a main section of the radial foil bearing shown in FIG. 2A.

A locking groove 14 is formed at each of both ends of the through groove 13 so as to communicate with the through groove 13. As shown in FIG. 3A being an exploded perspective view of a main section of the radial foil bearing 3, the locking groove 14 is a groove formed by cutting out a part from each of both side surfaces (both side surfaces in the axial direction) of the bearing housing 12. The locking groove 14 is formed from an inner circumferential edge (inner circumferential surface) toward an outer circumferential edge (outer circumferential surface) in the thickness direction (the radial direction) of the bearing housing 12. In addition, in this embodiment, in order to reliably communicate the locking groove 14 with the through groove 13, the locking groove 14 is formed having a sufficiently greater width than that of the through groove 13.

A locking recess 15 is formed on each of both inner side surfaces (surfaces facing each other in the circumferential direction) of the through groove 13. Each locking recess 15 is a groove-like recess formed in the length direction of the through groove 13 on the entire length thereof, and in this embodiment, is formed in a cross-sectional U-shape (a semicircular shape) whose maximum depth is about 0.2 to 0.3 mm. In addition, each locking recess 15 is formed at a depth position being 1 mm or less from the opening of the through groove 13, for example, from the inner circumferential surface of the bearing housing 12. Accordingly, as described below, the tip of a projecting portion of the top foil 9 can be locked in the locking recess 15.

In order to form the through groove 13 and the locking recesses 15, wire-cut electrical discharge machining is suitably used. That is, when forming a groove continuous from one end to the other end in the axial direction of the bearing housing 12, such as the through groove 13 or the groove-like locking recess 15, using the wire-cut electrical discharge machining, by moving a wire thereof along the edge of the cross-sectional shape of the groove, each groove can be easily and accurately formed. Particularly, in this embodiment, if the wire-cut electrical discharge machining is adopted, the through groove 13 and the locking recesses 15 at both inner side surfaces of the through groove 13 can be easily formed through a series of machining, and thus it is possible to sufficiently decrease the machining cost of the through groove 13 and the locking recesses 15.

In the locking groove 14, since a groove continuous from the outer surface to the inner surface of the bearing housing 12 is formed, if wire-cut electrical discharge machining is adopted, it is possible to sufficiently decrease the machining cost thereof. However, since the machining of the locking groove 14 does not require particular high accuracy, it is also possible to adopt cutting work using an end mill, or the like.

A fixing member 16 is fitted and locked in the through groove 13 and in the locking grooves 14. As shown in FIG. 3A, in FIG. 3B being a plan view of the through groove 13 and the fixing member 16, and in FIG. 3C being a cross-sectional side view of the through groove 13 and the fixing member 16, the fixing member 16 includes a bar-shaped (square pole-shaped) base portion 17 which is fitted and accommodated in the through groove 13, a pair of bent pieces 18 which are formed on both ends of the base portion 17 and which are locked in the pair of locking grooves 14, and two partition pieces 19 which are formed in an intermediate portion of the base portion 17 and which project opposite to the bent pieces 18.

The base portion 17 is formed so that the height thereof is about 0.5 to 1.5 mm and so that the top surface thereof (the surface in which the partition piece 19 is provided) is depressed about 1 mm from the opening of the through groove 13. The bent piece 18 is formed having a length which is approximately equivalent to the distance between the bottom surface of the through groove 13 and the outer circumferential surface of the bearing housing 12. Accordingly, the bent piece 18 contacts the locking groove 14 with a sufficient contact area and is prevented from projecting from the outer circumferential surface of the bearing housing 12.

A restriction portion is composed of the bent pieces 18 and the locking grooves 14 provided communicating with the through groove 13. That is, the pair of bent pieces 18 are locked in the locking grooves 14 provided at both ends of the through groove 13, and the bearing housing 12 is held between the pair of bent pieces 18 in the axial direction. Therefore, movement of the fixing member 16 is restricted in the length direction of the through groove 13 (in the axial direction of the bearing housing 12), and the movement thereof is substantially prevented except for a movement based on a clearance.

Figure 3B:
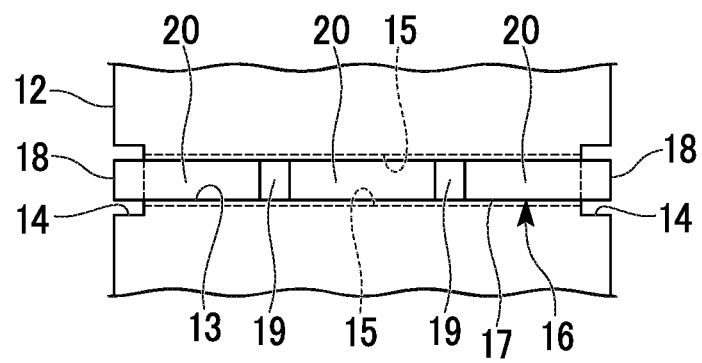
FIG. 3B is a plan view showing a state where a fixing member fits in a through groove.
Figure 3C:
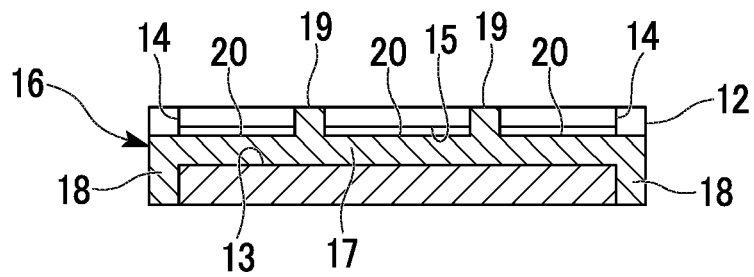
FIG. 3C is a cross-sectional side view showing a state where the fixing member fits in the through groove.

As shown in FIGS. 3B and 3C, the partition pieces 19 are formed at two positions which divide the base portion 17 into approximately three portions, that is, which divide the through groove 13 into approximately three grooves. The partition piece 19 is formed so that the level of the top thereof is the same as that of the opening of the through groove 13 or so that the top slightly projects from the through groove 13. For example, the top of the partition piece 19 may project approximately half of the height of the back foil 11 from the through groove 13. The partition pieces 19 divide the through groove 13 into approximately three grooves in the length direction thereof, and thereby, three engagement grooves 20 are formed inside the through groove 13 by the fixing member 16.

That is, the fixing member 16 is fitted and locked in the locking grooves 14 and in the through groove 13 from the side of the inner circumferential surface of the bearing housing 12, and thereby the three engagement grooves 20 can be easily formed. The depth of each engagement groove 20 is set to about 1 mm, and the locking recesses 15 open at both inner side surfaces of each engagement groove 20.

The fixing member 16 can be manufactured by, for example, machining a metal plate of stainless steel or the like having a thickness of about 3 to 4 mm using wire-cut electrical discharge machining.

Figure 4A:
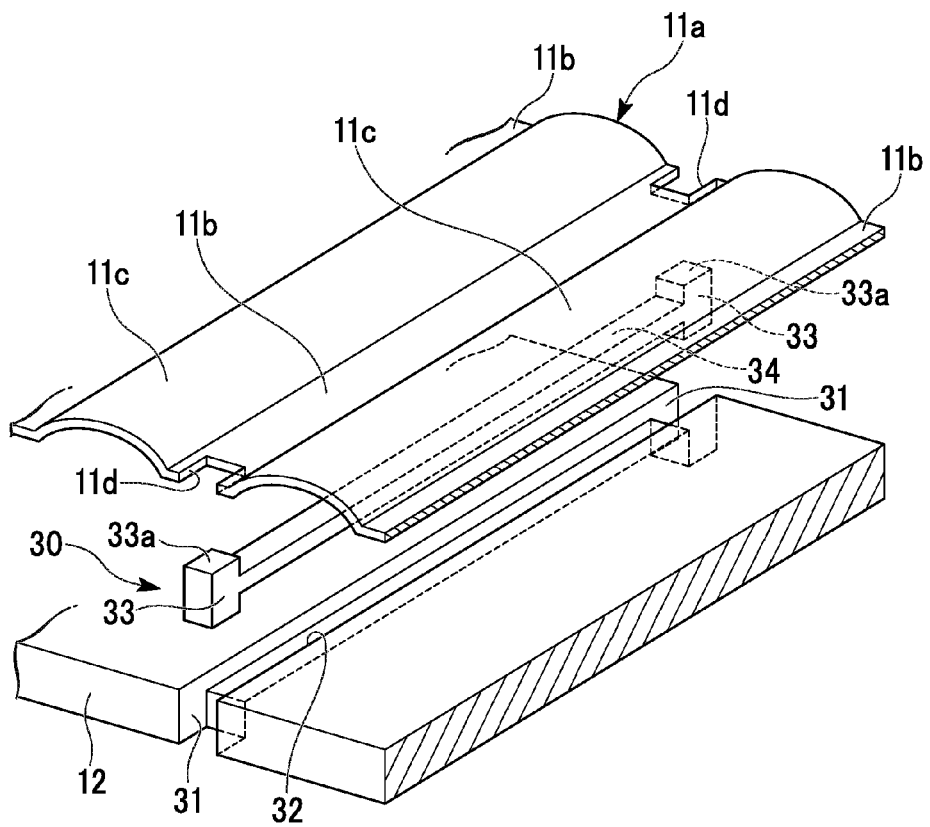
FIG. 4A is an exploded perspective view of a main section of the radial foil bearing shown in FIG. 2A.

As shown in FIG. 2A, engagement projections 33a are formed in the bearing housing 12 using locking members 30 in order to lock the back foil 11 (described below). That is, as shown in FIG. 4A being an exploded perspective view of a main section of the radial foil bearing 3, first engagement recesses 31 are formed on both side surfaces of the bearing housing 12 so as to be opposite to each other, wherein each first engagement recess 31 is formed in a groove shape extending from the inner circumferential edge (inner circumferential surface) toward the outer circumferential edge (outer circumferential surface) of the bearing housing 12. A pair of first engagement recesses 31 are formed at positions opposite to each other in the axial direction of the bearing housing 12. As shown in FIG. 2A, in this embodiment, the first engagement recesses 31 are formed at positions which divide each side surface of the bearing housing 12 into approximately three areas in the circumferential direction thereof. The locking members 30 are locked in the first engagement recesses 31. In addition, in this embodiment, the through groove 13 is arranged in an intermediate position between two first engagement recesses 31 in the first engagement recesses 31 disposed at three positions in one side surface of the bearing housing 12.

As shown in FIG. 4A, grooves 32 are formed in the inner circumferential surface of the bearing housing 12, wherein the groove 32 is positioned between the first engagement recesses 31 opposite to each other and communicates with each of the first engagement recesses 31. The depth of the groove 32 is set to be less than that of the first engagement recess 31, that is, than the depth toward the outer circumferential surface of the bearing housing 12 (in this embodiment, equivalent to the thickness of the bearing housing 12). Therefore, in this embodiment, a step is formed between the first engagement recess 31 and the groove 32 (refer to FIG. 4A).

Figure 4B:
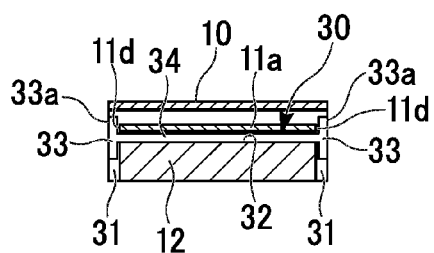
FIG. 4B is a cross-sectional view taken along A-A line in FIG. 2A.

The locking member 30 is locked in the first engagement recesses 31 and in the groove 32. The locking member 30 includes a pair of engagement arms 33 engaging with the first engagement recesses 31, and a connection portion 34 connecting the engagement arms 33, and thus is formed in an H-shape. As shown in FIG. 4B being a cross-sectional view taken along A-A line in FIG. 2A, the connection portion 34 is engaged with and accommodated in the groove 32, and is formed so as not to project outside of the groove 32 (inside of the bearing housing 12 in the radial direction). Specifically, the depth of the groove 32 is set to about 1 to 2 mm, and thus the height of the connection portion 34 is also set to about 1 to 2 mm.

Each of the pair of engagement arms 33 is formed extending upward and extending downward with respect to the connection portion 34, and thereby the locking member 30 is formed in an H-shape as described above. A portion of the engagement arm 33 extending upward, that is, a portion of the engagement arm 33 opposite to another portion thereof engaging with the first engagement recess 31, projects from the inner circumferential surface of the bearing housing 12, and thereby composes the engagement projection 33a which engages with an engagement notch 11d of a back foil piece 11a (described below).

A portion of the engagement arm 33 extending downward is locked on the above-described step between the first engagement recess 31 and the groove 32. Therefore, movement of the locking member 30 is restricted in the axial direction with respect to the bearing housing 12.

The engagement arm 33 or the connection portion 34 of the locking member 30 may be formed in a square pole shape as shown in FIG. 4A, or in a columnar shape (a round bar shape). The thickness of the engagement arm 33 or the connection portion 34 is set to about 0.3 to 0.5 mm. The locking member 30 can be manufactured by, for example, processing a metal foil of stainless steel or the like having a thickness less than 0.5 mm into an H-shape using etching or wire-cut electrical discharge machining.

The groove 32 can be formed through wire-cut electrical discharge machining, similarly to the through groove 13. In addition, the first engagement recesses 31 can be formed through wire-cut electrical discharge machining, cutting work using an end mill, or the like, similarly to the locking grooves 14. That is, the through groove 13 and the grooves 32 can be continuously formed through wire-cut electrical discharge machining, and the locking grooves 14 and the first engagement recesses 31 can be continuously formed through wire-cut electrical discharge machining or the like. Thus, it is possible to decrease the machining cost of the bearing housing 12.

After the grooves 32 and the first engagement recesses 31 are formed in this way, the locking member 30 is fitted and locked in the first engagement recesses 31 and in the groove 32 from the side of the inner circumferential surface of the bearing housing 12, and thereby the engagement projections 33a can be easily formed.

Figure 5A:
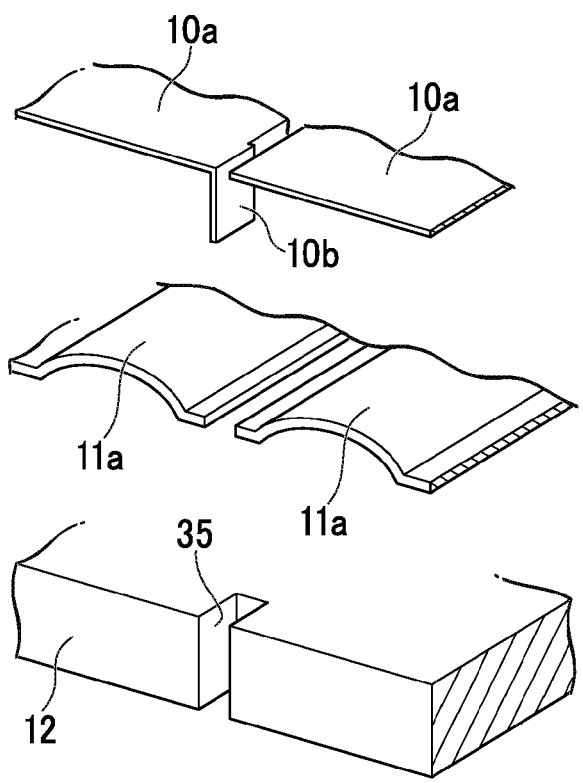
FIG. 5A is an exploded perspective view of a main section of the radial foil bearing shown in FIG. 2A.

As shown in FIG. 2A, second engagement recesses 35 are formed on both side surfaces of the bearing housing 12 in order to hold intermediate foil pieces 10a (described below). The second engagement recess 35 functions as the engagement recess of the present invention. As shown in FIG. 5A being an exploded perspective view of a main section of the radial foil bearing 3, the second engagement recess 35 is formed in a groove shape extending from the inner circumferential edge (inner circumferential surface) to the outer circumferential edge (outer circumferential surface) of the bearing housing 12. As shown in FIG. 2A, a pair of second engagement recesses 35 are formed on both side surfaces of the bearing housing 12 so as to be opposite to each other. In this embodiment, a total of three pairs of second engagement recesses 35 having the above configuration are formed, and the second engagement recesses 35 are formed at positions which divide each side surface of the bearing housing 12 into approximately three areas in the circumferential direction thereof.

The second engagement recesses 35 are disposed so as to be shifted half of a pitch with respect to the first engagement recesses 31. That is, one pair of second engagement recesses 35 in the three pairs thereof are disposed to be adjacent to one side of the through groove 13, and each pair of the other two pairs thereof are disposed in a center portion between the first engagement recesses 31 which are positioned to be next to each other in the circumferential direction.

The second engagement recess 35 can be also formed through wire-cut electrical discharge machining, similarly to the locking groove 14 or to the first engagement recess 31. That is, the locking grooves 14, the first engagement recesses 31, and the second engagement recesses 35 can be continuously formed through wire-cut electrical discharge machining. Thus, it is possible to decrease the machining cost of the bearing housing 12. In addition, laser machining can be adopted instead of wire-cut electrical discharge machining.

The back foil 11 is formed of foils (thin sheets) and elastically supports the intermediate foil 10 and the top foil 9. As such a back foil 11, for example, a bump foil, a sprig foil disclosed in Japanese Unexamined Patent Application, First Publication No. 2006-57652 or Japanese Unexamined Patent Application, First Publication No. 2004-270904, a back foil disclosed in Japanese Unexamined Patent Application, First Publication No. 2009-299748, or the like can be used. In this embodiment, a bump foil is used for the back foil 11. However, the spring foil or the back foil described above may also be used for the back foil of the present invention.

In this embodiment, the back foil 11 (bump foil) includes three (a plurality of) back foil pieces 11a which are disposed in the circumferential direction of the bearing housing 12.

Each back foil piece 11a is a member in which a foil (thin sheet) is formed in a wave sheet shape and in which the side shape thereof is set to be an approximately arc shape as a whole, and all three the back foil pieces 11a are formed having the same shape and dimensions. Thus, the back foil pieces 11a are disposed so as to divide the inner circumferential surface of the bearing housing 12 into approximately three areas.

At positions between which the through groove 13 is disposed, the back foil pieces 11a are disposed forming a comparatively large gap therebetween, and at other positions, the back foil pieces 11a are disposed so that end portions thereof facing each other form a predetermined gap. The above-described second engagement recess 35 is formed at the position corresponding to the predetermined gap. In positions between which the through groove 13 is disposed, the second engagement recess 35 is also formed to be adjacent to one side of the through groove 13. According to this configuration, the three back foil pieces 11a are formed in an approximately cylindrical shape as a whole, and are disposed in the circumferential direction of the top foil 9 via the intermediate foil 10.

Figure 6A:
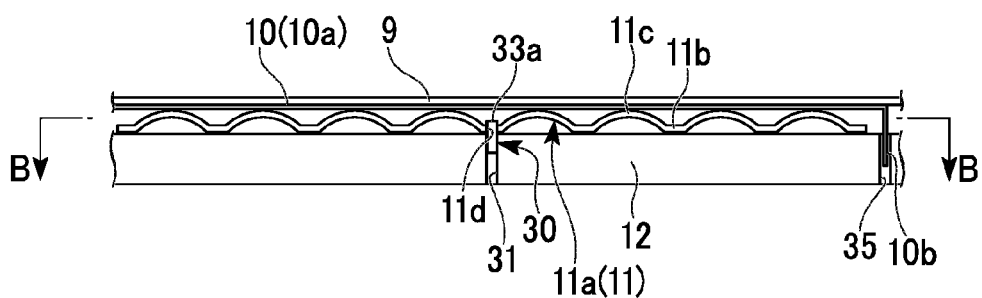
FIG. 6A is a side view in which a main section of FIG. 2A is flattened and is schematically shown.

As shown in FIG. 6A in which a main section of FIG. 2A is flattened and is schematically shown, in the back foil piece 11a formed in a wave sheet shape as described above, flattened valley portions 11b contacting the bearing housing 12 and curved peak portions 11c contacting the intermediate foil 10 (the intermediate foil pieces 10a) are alternately formed in the circumferential direction of the bearing housing 12. Accordingly, the back foil pieces 11a elastically support the top foil 9 via the intermediate foil pieces 10a, particularly through the peak portions 11c contacting the intermediate foil pieces 10a (the intermediate foil 10). In addition, fluid passageways are formed by the peak portions 11c and the valley portions 11b, wherein the fluid passageway extends in the axial direction of the radial foil bearing 3.

Figure 6B:
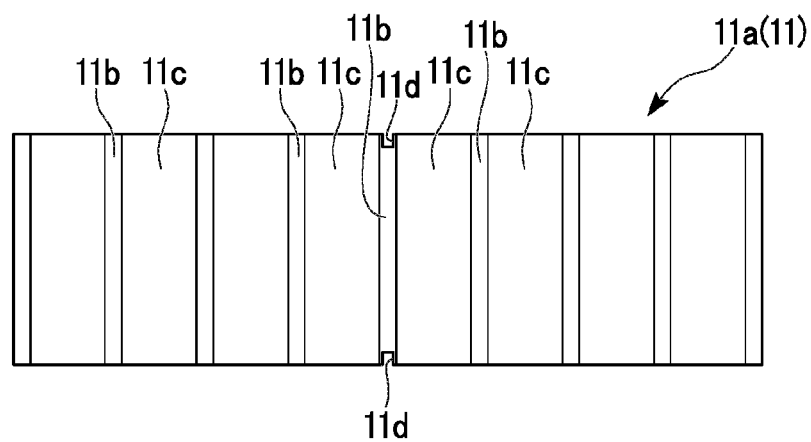
FIG. 6B is a view taken along B-B line in FIG. 6A.

As shown in FIG. 6B being a view taken along B-B line in FIG. 6A, engagement notches 11d are formed on both side edges (both edges in the axial direction) of a circumferentially center portion (a center portion in the circumferential direction of the bearing housing 12) of each back foil piece 11a. As shown in FIG. 6A, the engagement notches 11d are formed in a valley portion 11b of the back foil piece 11a, and the engagement notch 11d is a notch formed by cutting out, from the flattened valley portion 11b positioned between the peak portions 11c, a rectangular part extending from the edge toward the center of the valley portion 11b.

The engagement notch 11d is formed at a position corresponding to the engagement projection 33a of the locking member 30 provided in the bearing housing 12, that is, at a position overlapping with the engagement projection 33a.

So as to engage with the engagement projection 33a, the engagement notch 11d is formed having a length and width which are approximately the same as the length and width of the engagement projection 33a. Specifically, the width of the engagement notch 11d in the circumferential direction of the bearing housing 12 is set to about 0.2 to 0.4 mm, and the length of the engagement notch 11d in the axial direction is set to about 1 to 2 mm.

In order to prevent occurrence of burr or distortion due to machining on a back foil piece, it is preferable that the engagement notch 11d be formed by performing etching or electrical discharge machining on a foil. That is, it is preferable that the engagement notches 11d be formed in a foil using etching or electrical discharge machining, and thereafter, press molding be performed on the foil in order to form the peak portions 11c and the valley portions 11b, thereby forming the back foil piece 11a.

Based on this configuration, as shown in FIGS. 4A and 6A, the engagement notch 11d of the back foil piece 11a engages with the engagement projection 33a (the engagement arm 33 of the locking member 30) of the bearing housing 12.

In this way, the engagement notch 11d of the back foil piece 11a engages with the engagement projection 33a of the engagement arm 33 extending upward, and in this state, the three back foil pieces 11a are disposed on the inner circumferential surface of the bearing housing 12. Therefore, the locking member 30, particularly, the connection portion 34 thereof, is covered with the back foil piece 11a, whereby the detachment of the locking member 30 from the bearing housing 12 is prevented.

Figure 5B:
FIG. 5B is a plan view of an intermediate foil piece.
Figure 5C:
FIG. 5C is a side view of the intermediate foil piece.

As shown in FIG. 2A, the intermediate foil 10 is disposed between the top foil 9 and the back foil 11 composed of the three back foil pieces 11a. In this embodiment, the intermediate foil 10 includes three intermediate foil pieces 10a which are disposed in the circumferential direction of the bearing housing 12. As shown in FIGS. 5B and 5C, the intermediate foil piece 10a is formed so that the developed shape thereof is an approximately rectangular shape. Each intermediate foil piece 10a is curved at a predetermined curvature so as to form the three intermediate foil pieces 10a in an approximately cylindrical shape, whereby each intermediate foil piece 10a is formed in an arc shape in side view. In addition, a projecting piece shown by a dashed double-dotted line is formed at each of both ends (both ends in the axial direction) of one short side of the intermediate foil piece 10a, and by bending the projecting piece at an approximately right angle, an engagement-projecting piece 10b is formed.

Figure 5D:
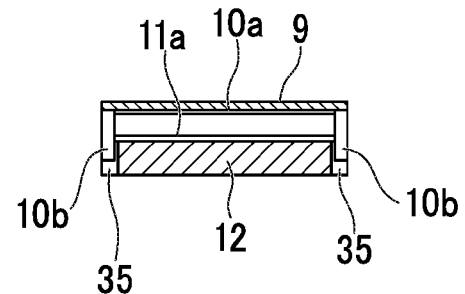
FIG. 5D is a cross-sectional view taken along C-C line in FIG. 2A.

As shown in FIGS. 2A, 5A and 6A, the engagement-projecting piece 10b formed through the above way engages with the second engagement recess 35 of the bearing housing 12 through each gap formed between the three back foil pieces 11a. Accordingly, as shown in FIG. 5D being a cross-sectional view taken along C-C line in FIG. 2A, the intermediate foil piece 10a is held on the bearing housing 12 in a state where the intermediate foil piece 10a covers the back foil piece 11a. In the intermediate foil piece 10a held on the bearing housing 12 in this way, particularly, the engagement-projecting pieces 10b formed on both sides thereof engage with the second engagement recesses 35 so that both side surfaces of the bearing housing 12 are held between the engagement-projecting pieces 10b. Thus, even when unexpected external force due to shaft deflection or the like of the rotary shaft 1 is added to the radial foil bearing 3, the intermediate foil piece 10a is prevented from rotating inside the bearing housing 12. Furthermore, since the movement thereof in the axial direction inside the bearing housing 12 is restricted, the detachment of the intermediate foil piece 10a from the bearing 3 is prevented.

As shown in FIG. 2A, the top foil 9 is formed by being wound in a cylindrical shape along the inner surface of the intermediate foil 10 composed of the three intermediate foil pieces 10a. The top foil 9 is arranged so that a projecting portion 21a formed in one end portion (one end portion in the circumferential direction) thereof and projecting portions 21b formed in the other end portion thereof engage with the engagement grooves 20 in the through groove 13 formed in the bearing housing 12. A rectangular metal foil as shown in FIG. 7A being a development view of the top foil 9, in which the long side thereof is in the circumferential direction of the bearing and the short side thereof is in the length direction of the bearing, is wound in the arrow direction (the length direction of the long side: the circumferential direction) in FIG. 7B being a side view of the foil, to be in a cylindrical shape, whereby the top foil 9 is formed.

Figure 7A:
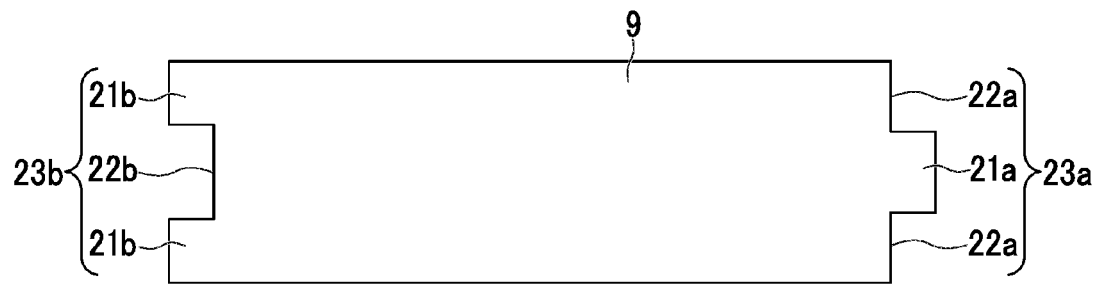
FIG. 7A is a development view of a top foil.

As shown in FIG. 7A, in the top foil 9, a first uneven portion 23a is formed in one side (short side) thereof, wherein the first uneven portion 23a includes one projecting portion 21a and two depressed portions 22a, and a second uneven portion 23b is formed in the other side (short side) opposite to the one side (short side), wherein the second uneven portion 23b includes two projecting portions 21b and one depressed portion 22b. The depressed portion 22b of the second uneven portion 23b is formed so as to correspond to the projecting portion 21a of the first uneven portion 23a, and the depressed portions 22a of the first uneven portion 23a are formed so as to correspond to the projecting portions 21b of the second uneven portion 23b.

That is, the depressed portion 22b of the second uneven portion 23b is formed so that the projecting portion 21a passes through the depressed portion 22b when the top foil 9 is wound in a cylindrical shape in which the first and second uneven portions 23a and 23b overlap with each other. Similarly, the depressed portions 22a of the first uneven portion 23a is formed so that the projecting portions 21b pass through the depressed portions 22a when the top foil 9 is wound in the cylindrical shape. In addition, the projecting portions 21a and 21b are formed so that the width thereof corresponds to the length of the engagement groove 20 formed by the through groove 13 and by the fixing member 16 and is approximately the same as the length of the engagement groove 20.

Figure 8:
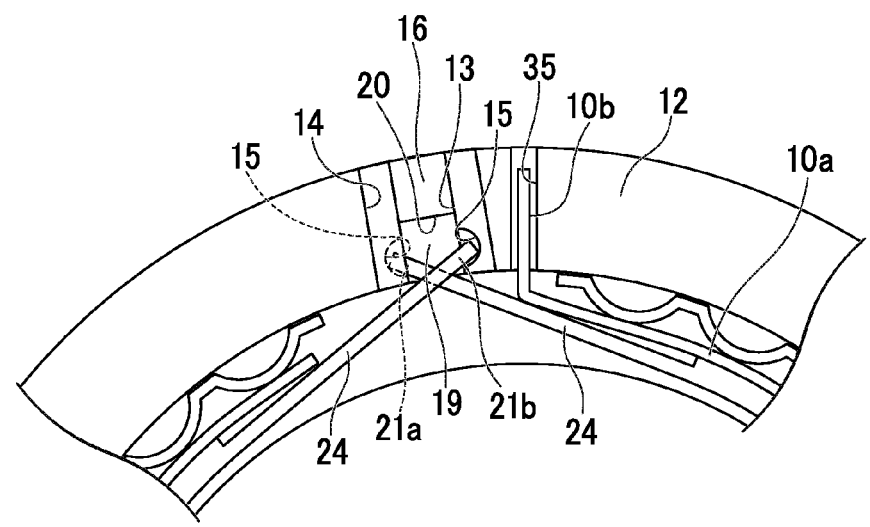
FIG. 8 is an enlarged view of a main section of FIG. 2A.

As shown in FIG. 2A, the projecting portions 21a and 21b passed through the depressed portions 22b and 22a are pulled out near the bearing housing 12, and the tips thereof are engaged with the engagement grooves 20 of the bearing housing 12. In this embodiment, as shown in FIG. 8 being an enlarged view of a main section of FIG. 2A, the tips of the projecting portions 21a and 21b are inserted in and engaged with the engagement grooves 20 in the through groove 13, and thereafter are further inserted into the locking recesses 15, to be locked thereon. Therefore, the top foil 9 is arranged so that the movement thereof in the circumferential direction is restricted and the amount of movement thereof becomes slight.

That is, the projecting portions 21a and 21b are arranged so that the tips thereof do not strongly butt against inner surfaces of the locking recesses 15 and so that the edge surfaces of the tips thereof contact inner surfaces of the locking recesses 15. Accordingly, at the time of the normal operation of the rotary shaft 1, since the projecting portions 21a and 21b do not receive large reaction force from the locking recesses 15 and the engagement grooves 20, the occurrence of distortion on the top foil 9 is prevented. In addition, even when unexpected external force due to shaft deflection or the like of the rotary shaft 1 is added to the radial foil bearing 3, the top foil 9 is prevented from rotating inside the bearing housing 12 and from being detached from a space between the bearing housing 12 and the rotary shaft 1.

That is, when unexpected external force is added thereto, since the projecting portions 21a and 21b are strongly locked on inner surfaces of the locking recesses 15, the projecting portions 21a and 21b are prevented from getting out of the locking recesses 15 and further of the engagement grooves 20. Accordingly, it is prevented that by the top foil 9 rotating or being largely deformed, the projecting portions 21a and 21b get out of the depressed portions 22b and 22a, and thus the top foil 9 is detached from the bearing housing 12.

The movement of the projecting portions 21a and 21b in the axial direction is restricted by the partition pieces 19 of the fixing member 16 which form the engagement grooves 20. That is, both sides of the projecting portion 21a are restricted by the partition pieces 19, whereby the movement in the axial direction of the first uneven portion 23a including the projecting portion 21a is restricted. In addition, inner sides of the two projecting portions 21b are restricted by the partition pieces 19, and the projecting portions 21b are also restricted in opposite directions to each other, whereby the movement in the axial direction of the second uneven portion 23b including the two projecting portions 21b is restricted. In this way, since movement of the top foil 9 is restricted in the axial direction of the bearing housing 12, the top foil 9 is prevented from popping out from the bearing housing 12.

Figure 7B:
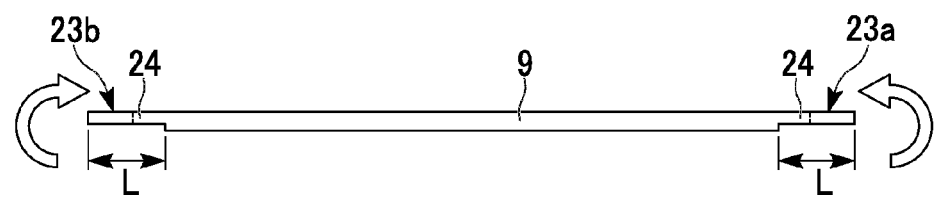
FIG. 7B is a development side view of the top foil.

As shown in FIG. 7B, in the top foil 9, thin portions 24 are formed in a portion thereof (one side) in which the first uneven portion 23a is formed and in a portion thereof (the other side) in which the second uneven portion 23b is formed, wherein the thin portions 24 are thinner than an intermediate portion therebetween. As shown in FIG. 2A, the thin portions 24 are formed by being thinned into a state where the outer circumferential surfaces thereof (surfaces facing the bearing housing 12) are depressed from the outer circumferential surface of the above intermediate portion.

In order to form the thin portions 24, both end portions of the top foil 9 are formed so as to have a desired thickness (thinness) through, for example, etching, while the thickness is controlled by the ten micrometers. Specifically, in a case where the diameter of the bearing is 35 mm, when the thickness of the top foil 9 is 100 μm, the thickness of the thin portion 24 is set to about 80 μm. In addition, in such etching, the stress occurring in the top foil 9 is extremely small compared to that of bending machining or the like, and thus distortion of the top foil 9 scarcely occurs.

The length L, shown in FIG. 7B, of the thin portion 24 in the circumferential direction is set to be the length obtained by adding up the through groove 13 and one peak in an end portion of the back foil 11 (bump foil) as shown in FIG. 2A.

By forming the thin portions 24 in both end portions of the top foil 9 in the above way, it becomes easy to elastically deform both end portions (the thin portions 24) thereof, and thus both end portions are formed to be curved surfaces along curved surface composing the inner circumferential surface of the bearing housing 12. Accordingly, force (local preload) clamping the rotary shaft 1 also scarcely occurs at both end portions of the top foil 9.

Since the thin portions 24 are formed by being thinned so that the outer circumferential surfaces of both end portions of the top foil 9 are depressed from the outer circumferential surface of the intermediate portion thereof, a gap is formed between the thin portion 24 and one peak in an end portion of the back foil 11 which supports the outer circumferential surface of the top foil 9 via the intermediate foil 10. Accordingly, in the thin portions 24, occurrence of force (local preload) clamping the rotary shaft 1 is reliably prevented. In addition, the length L of the thin portion 24 in the circumferential direction may be set to be the length obtained by adding up the through groove 13 and about three peaks of an end portion of the back foil 11, instead of the example shown in FIG. 2A.

Next, the operation of the radial foil bearing 3 having the above configuration is described.

In a state where the rotary shaft 1 stops, the top foil 9 is pushed by the back foil 11 (three back foil pieces 11a) via the intermediate foil 10 (three intermediate foil pieces 10a) toward the rotary shaft 1, thereby closely contacting the rotary shaft 1. In addition, in this embodiment, since both end portions of the top foil 9 include the thin portions 24, force (local preload) clamping the rotary shaft 1 scarcely occurs in the thin portions 24.

When starting the rotary shaft 1 in the arrow P direction in FIG. 2A, at first, the rotary shaft 1 starts rotating at a low speed, and thereafter the rotation thereof is gradually accelerated and the rotary shaft 1 rotates at a high speed. Then, as shown by the arrow Q in FIG. 2A, an ambient fluid is led from each one end of the top foil 9, the intermediate foil 10, and the back foil 11, and flows into a space between the top foil 9 and the rotary shaft 1. Therefore, a fluid lubrication film is formed between the top foil 9 and the rotary shaft 1.

The film pressure of the fluid lubrication film is added to the top foil 9, and presses each peak portion 11c of the back foil pieces 11a via the intermediate foil 10 which contacts the top foil 9. Then, the back foil pieces 11a are pressed by the intermediate foil 10, and thus the peak portions 11c are pressed and extended, whereby the back foil pieces 11a start moving on the bearing housing 12 in the circumferential direction thereof. That is, since the back foil pieces 11a (the back foil 11) elastically support the top foil 9 via the intermediate foil 10, the back foil pieces 11a are deformed in the circumferential direction at the time of receiving a load from the top foil 9, and thereby accept the flexure of the top foil 9 or of the intermediate foil 10 and support them.

However, as shown in FIGS. 4A and 4B, the engagement projections 33a of the locking member 30 engage with the engagement notches 11d provided in side edges of the back foil piece 11a, whereby the back foil piece 11a is prevented from rotating in the circumferential direction on the inner circumferential surface of the bearing housing 12. Thus, although each peak portion 11c of the back foil piece 11a is deformed (moves) in the circumferential direction in a state where the engagement notch 11d with which the engagement projection 33a engages is the fixed point (fixed end) thereof, the center of the back foil piece 11a is prevented from deviating from the original position thereof.

When the back foil piece 11a is deformed (moves) in the circumferential direction, since receiving the influence of friction with the bearing housing 12 or with the intermediate foil 10, both end portions of the back foil piece 11a, that is, free ends, are easily deformed (easily move), but it is difficult to deform portions thereof near the fixed point (fixed end). Accordingly, a difference in support rigidity may occur between a portion near the free end and a portion near the fixed end of the back foil piece 11a.

However, in this embodiment, since the back foil 11 is composed of three back foil pieces 11a, the distance between the fixed end and the free end is shorter than that in a case where the back foil 11 is composed of one foil. Thus, the difference in support rigidity is small. In addition, since the engagement notch 11d is formed in the circumferentially center portion of the back foil piece 11a and the fixed point by the engagement projection 33a is set to the circumferentially center portion of the back foil piece 11a, the distance between the fixed end and the free end is further decreased, and thus the difference in support rigidity between a portion near the free end and a portion near the fixed end is further decreased.

At the time the rotary shaft 1 rotates at a high speed, since the engagement projections 33a hold the movement of the back foil piece 11a in the axial direction, even if unexpected impact or the like is added thereto, the detachment of the back foil piece 11a from the bearing housing 12 can be prevented.

Similarly, the engagement-projecting pieces 10b of the intermediate foil piece 10a engage with the second engagement recesses 35 formed on both side surfaces of the bearing housing 12. Accordingly, even if unexpected impact or the like is added thereto, the intermediate foil piece 10a is prevented from rotating inside the bearing housing 12 and from moving in the axial direction inside the bearing housing 12. In addition, with respect to the radial direction, since the intermediate foil piece 10a is covered with the top foil 9, this structure functions as a stopper, and thus the intermediate foil piece 10a is prevented from being detached from the radial foil bearing 3.

In a transient state before the fluid lubrication film is formed, solid friction occurs between the rotary shaft 1 and the top foil 9, and this friction makes resistance at the time of start-up. However, as described above, preload does not occur in each of the two end portions of the top foil 9. In addition, a side of the top foil 9 into which an ambient fluid flows includes the thin portion 24 being flexible, and the top foil 9 is configured to be easily separated from the rotary shaft 1. Therefore, after the rotary shaft 1 is started, a fluid lubrication film is formed in a short time, and the rotary shaft 1 rotates in a non-contact state with respect to the top foil 9.

In the radial foil bearing 3 as described above, since the intermediate foil 10 is disposed between the top foil 9 and the back foil 11, if shaft vibration (self-excited vibration) occurs in the rotary shaft 1 during rotation, a film pressure variation due to the vibration is transmitted from the top foil 9 to the back foil 11 (the back foil pieces 11a) via the intermediate foil 10 (the intermediate foil pieces 10a). At this time, due to a load variation, slight flexure (changing due to a load) is caused into the top foil 9, and thereby, "slides" occur between the top foil 9 and the intermediate foil 10 and further between the intermediate foil 10 and the back foil 11. Energy dissipation is caused by friction according to the "slides", and the film pressure variation is damped. That is, the damping effect can be obtained. Thus, using this damping effect, it is possible to suppress the shaft vibration (self-excited vibration) and to easily settle the shaft vibration.

In addition, since the intermediate foil 10 is composed of three (a plurality of) intermediate foil pieces 10a disposed in the circumferential direction of the bearing housing 12, compared to a case where an intermediate foil composed of one film is disposed on the entire circumference of the bearing housing 12, the "slide" with the back foil 11 or with the top foil 9 is not easily restricted, and the restraint area due to friction decreases. Thus, a slide between each intermediate foil piece 10a and the back foil 11 or between each intermediate foil piece 10a and the top foil 9 easily occurs, and it is possible to improve the damping effect using friction caused by the slide.

Since the engagement-projecting pieces 10b formed in the intermediate foil piece 10a are engaged with the second engagement recesses 35 formed on both side surfaces of the bearing housing 12, without performing spot welding or large bending machining on each intermediate foil piece 10a, the intermediate foil 10 composed of the intermediate foil pieces 10a can be accommodated in and fixed to the bearing housing 12. Thus, the occurrence of distortion of the top foil 9 due to spot welding on the intermediate foil 10 or due to the distortion of the intermediate foil 10 can be prevented, and it is possible to sufficiently decrease the distortion of the top foil 9. In this way, since the distortion of the top foil 9 is sufficiently decreased, with respect to the load capability or the dynamic characteristics (the rigidity and the damping performance) of the bearing, the designed favorable performance can be obtained.

Since the welding on the intermediate foil 10 or on the back foil 11 is unnecessary, assembly failures or assembly variations due to welding defects can be eliminated, and by simplifying the production thereof, the assembly reproducibility can be improved. Therefore, the production cost can be decreased. Furthermore, when the intermediate foil piece 10a or the back foil piece 11a is damaged or wasted, without replacing the entire intermediate foil 10 or the entire back foil 11, it is only necessary to replace only a damaged or wasted part (the intermediate foil piece 10a or the back foil piece 11a) with a new one.

Since the back foil 11 is composed of a plurality of back foil pieces 11a disposed in the circumferential direction of the bearing housing 12, the distance between the fixed end and the free end of the back foil piece 11a is decreased, and a difference in support rigidity thereof between a portion near the free end and a portion near the fixed end is decreased. Thus, the variations in the support rigidity in the entire back foil 11 can be decreased.

Since the engagement notches 11d are formed in the circumferentially center portion of the back foil piece 11a, a difference in support rigidity between a portion near the free end and a portion near the fixed end of each back foil piece 11a is further decreased. Thus, the variation in support rigidity in the entire back foil 11 can be further decreased.

Since the back foil 11 is composed of a plurality of back foil pieces 11a, by inserting the engagement-projecting pieces 10b of the intermediate foil piece 10a into gaps formed between the back foil pieces 11a, the engagement-projecting pieces 10b can be easily engaged with the second engagement recesses 35.

The engagement notch 11d formed at each of both side edges of the back foil piece 11a is engaged with the engagement projection 33a formed at each of both side ends of the inner circumferential surface of the bearing housing 12, whereby the back foil piece 11a is fixed to the bearing housing 12. Accordingly, without performing spot welding or bending machining on the back foil piece 11a, the back foil piece 11a can be accommodated in and fixed to the bearing housing 12. Thus, the occurrence of distortion of the top foil 9 due to spot welding on the back foil 11 (the back foil pieces 11a) or due to the distortion of the back foil 11 can be prevented, and the distortion of the top foil 9 can be sufficiently decreased.

Since the through groove 13 is continuously formed from one end to the other end in the axial direction of the bearing housing 12, the through groove 13 can be easily formed through wire-cut electrical discharge machining, and thus the machining cost thereof can be suppressed to be low.

Even if a positional difference in the axial direction occurs between the top foil 9 and the bearing housing 12, the projecting portions 21a and 21b, which engage with the engagement grooves 20 formed by dividing the through groove 13 in the length direction thereof, are restricted by the ends (the partition pieces 19) of the engagement grooves 20 and the movements thereof are stopped, and therefore such a positional difference can be prevented.

Since the tips of the projecting portions 21a and 21b of the top foil 9 are engaged with the locking recesses 15 formed on inner side surfaces of the through groove 13, it is possible to easily perform the positioning and locking of the projecting portions 21a and 21b and furthermore to improve the assembly reproducibility of the top foil 9.

In the manufacturing process with respect to the top foil 9, only the forming process of the uneven portions 23a and 23b through etching is added thereto, and it is possible to remove spot welding in the related art or bending machining which may cause distortion. Thus, the difficulty of the manufacture thereof can be decreased, and the manufacturing cost thereof can be reduced.

Since the welding of the top foil 9 on the bearing housing 12 is removed, assembly failures or assembly variations due to welding defects are eliminated. Thus, the reproducibility thereof is improved, and excellent mass productivity is obtained.

Since the thin portions 24 are formed on both end portions of the top foil 9, force (local preload) clamping the rotary shaft 1 does not also occur at both end portions of the top foil 9. Thus, it is possible to prevent the starting torque from increasing due to preload, and to prevent the amount of heat generated during operation from exceeding the set value.

Since the thin portions 24 are formed on both end portions of the top foil 9, for example, a heat treatment process, as in the related art, to make both end portions of a top foil fit in an inner curved surface (inner circumferential surface) of a bearing housing is unnecessary.

By forming the thin portions 24 on both end portions of the top foil 9, the vicinity of a side of the top foil 9, into which an ambient fluid flows, has flexibility, and thus the ambient fluid easily flows into a space between the top foil 9 and the rotary shaft 1 as described above. Accordingly, a fluid lubrication film is formed at a low rotation speed, and thus the startability is improved.

Second Embodiment

Figure 9A:
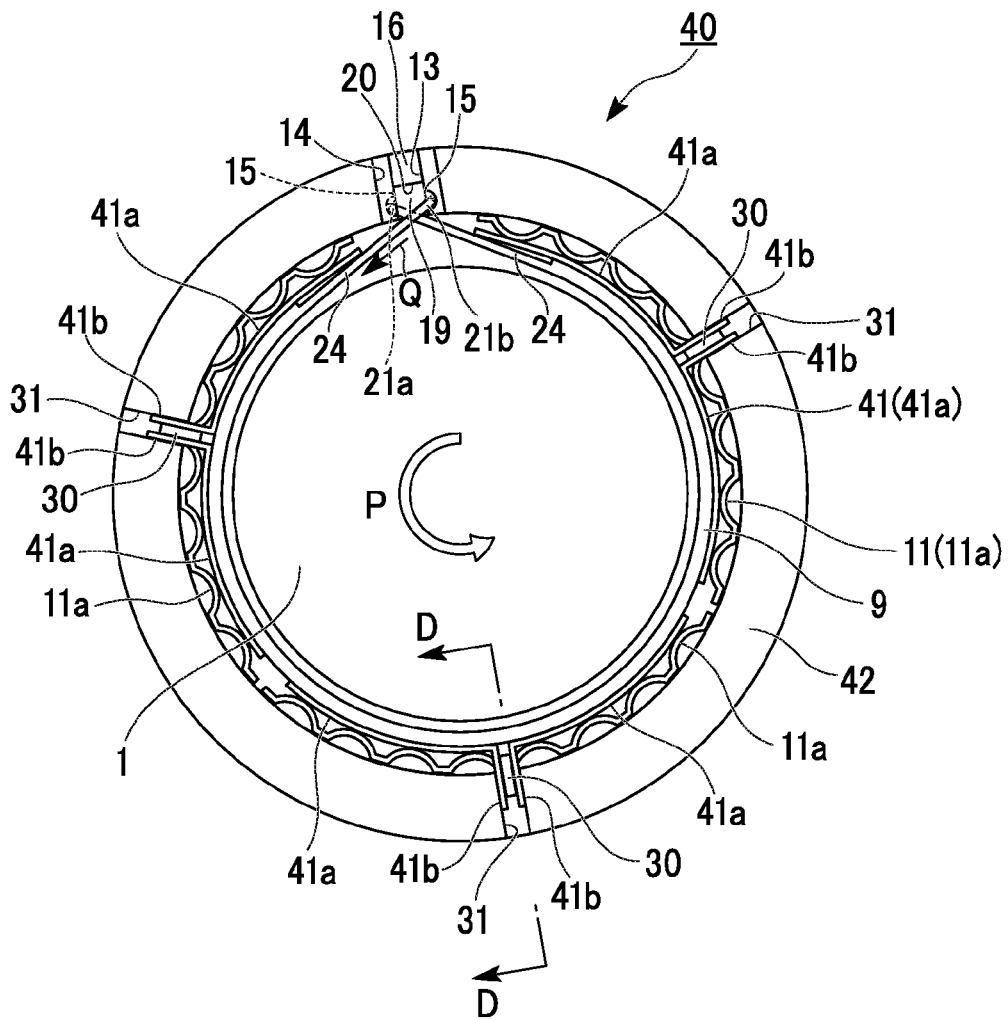
FIG. 9A is a side view of a radial foil bearing of a second embodiment of the present invention.

Next, a second embodiment of a radial foil bearing of the present invention is described. FIGS. 9A, 9B, 10A and 10B are views showing the second embodiment of the radial foil bearing provided in the turbo machine shown in FIG. 1. In FIG. 9A, a reference numeral 40 represents a radial foil bearing.

The radial foil bearing 40 is different from the radial foil bearing 3 shown in FIG. 2, in that an intermediate foil 41 is composed of six intermediate foil pieces 41a, and in that an engagement-projecting piece 41b of the intermediate foil piece 41a is engaged with a first engagement recess 31 with which an engagement arm 33 of a locking member 30 engages.

In this embodiment, a second engagement recess 35 is not formed in a bearing housing 42, and only first engagement recesses 31 are formed therein, wherein the first engagement recess 31 functions as the engagement recess of the present invention. In addition, the structures of a through groove 13 with which projecting portions 21a and 21b of a top foil 9 are engaged, a locking groove 14, a fixing member 16 and the like are the same as that of the first embodiment.

The intermediate foil piece 41a composing the intermediate foil 41 has structures which are approximately the same as that of the intermediate foil piece 10a of the first embodiment shown in FIGS. 5A and 5B. In addition, the intermediate foil piece 41a is different from the intermediate foil piece 10a, in that as shown in FIG. 9A, the intermediate foil piece 41a is formed so that the length thereof in the circumferential direction of the bearing housing 42 is set to approximately half of the length of a back foil piece 11a. That is, the intermediate foil piece 41a in this embodiment is also formed so that the developed shape thereof is an approximately rectangular shape, similarly to the configuration shown in FIGS. 5B and 5C. Furthermore, each intermediate foil piece 41a is curved at a predetermined curvature so as to form the six intermediate foil pieces 41a in an approximately cylindrical shape, and thus is formed in an arc shape in side view, which has a pair of engagement-projecting pieces 41b.

Figure 9B:
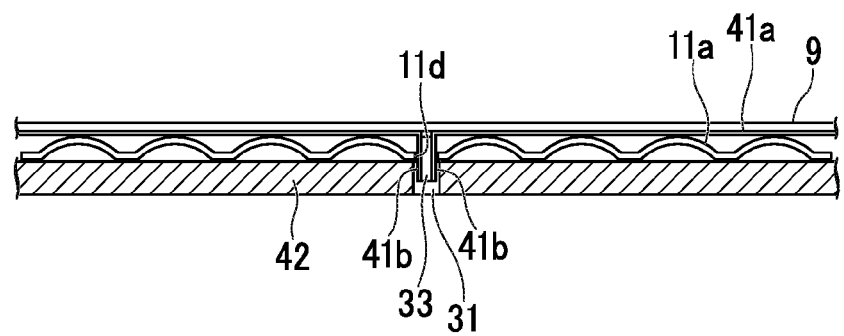
FIG. 9B is a side view in which a main section of FIG. 9A is flattened and is schematically shown.
Figure 10A:
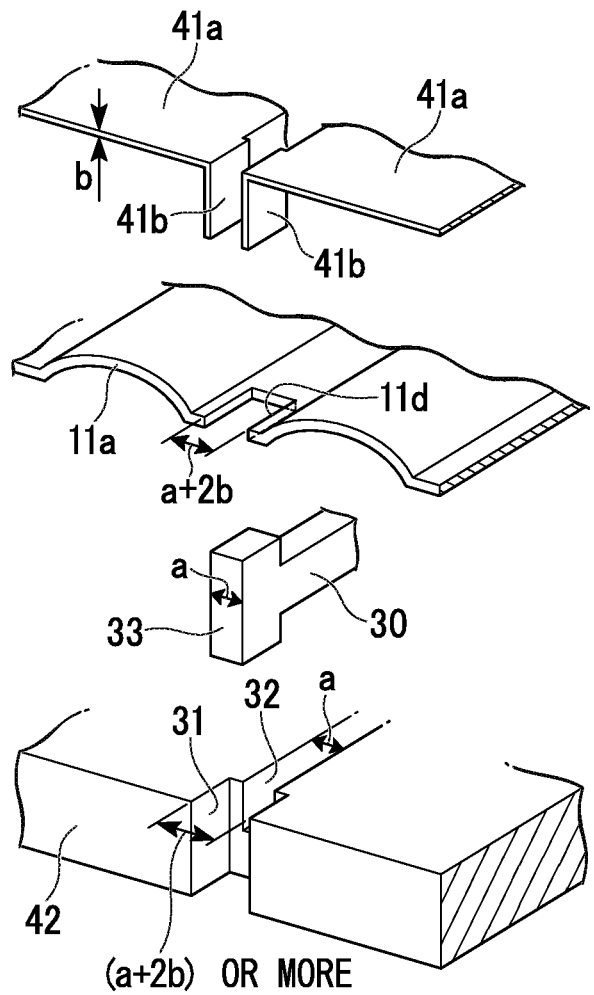
FIG. 10A is an exploded perspective view of a main section of the radial foil bearing shown in FIG. 9A.

In this embodiment, as shown in FIG. 9B, the engagement-projecting pieces 41b of the intermediate foil piece 41a engage with the first engagement recesses 31 through engagement notches 11d of the back foil piece 11a. That is, as shown in FIG. 10A, a pair of intermediate foil pieces 41a being next to each other in the circumferential direction of the bearing housing 42 are disposed so that the engagement-projecting pieces 41b of the intermediate foil pieces 41a face each other. The engagement-projecting pieces 41b are engaged with the first engagement recesses 31 through the engagement notches 11d. In this case, as shown in FIG. 9B, the pair of engagement-projecting pieces 41b are engaged with both sides (both sides in the circumferential direction) of the engagement arm 33 of the locking member 30 locked in the first engagement recess 31, that is, are engaged with gaps between side surfaces of the engagement arm 33 and inner side surfaces composing the first engagement recess 31.

Figure 10B:
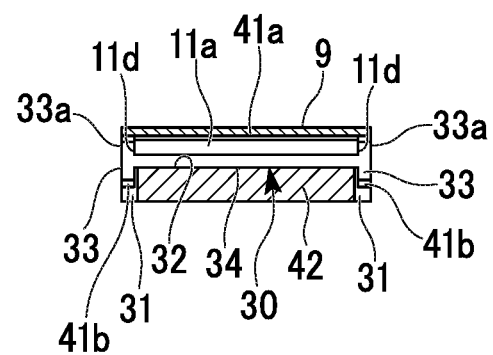
FIG. 10B is a cross-sectional view taken along D-D line in FIG. 9A.

In this embodiment, as shown in FIG. 10A, a groove 32, in which the locking member 30 is locked, and the first engagement recess 31, with which the engagement arm 33 is engaged, are formed so that the widths thereof (widths in the circumferential direction of the bearing housing 42) are different from each other. That is, in a case where a sign a denotes the thickness of the locking member 30 (the thickness in the circumferential direction, the thickness of the engagement arm 33 or of a connection portion 34) and a sign b denotes the thickness of the intermediate foil piece 41a (sheet thickness, the thickness of the engagement-projecting piece 41b), the width of the groove 32 is set to the length shown by the sign a, and in contrast, the width of the first engagement recess 31 of the bearing housing 42 is set to the length or more shown by the signs (a+2b). In addition, the width of the engagement notch 11d of the back foil piece 11a is set to approximately the length shown by the signs (a+2b). Therefore, as shown in FIG. 10B being a cross-sectional view taken along D-D line in FIG. 9A, the connection portion 34 of the locking member 30 is engaged with the groove 32. In addition, the engagement arm 33 (an engagement projection 33a) of the locking member 30 and a pair of engagement-projecting pieces 41b are together engaged with the engagement notch 11d. Furthermore, the engagement arm 33 of the locking member 30 and the pair of engagement-projecting pieces 41b are together engaged with the first engagement recess 31.

The above dimensions can be appropriately changed. For example, by thinning the engagement arm 33 through etching, the thickness of the engagement arm 33 may be set to the length shown by the signs (a−2b), the width of the first engagement recess 31 may be set to the length shown by the signs (a+α) which is slightly greater than the length shown by the sign a, and the width of the engagement notch 11d may be set to the length shown by the sign a.

In the radial foil bearing 40 having the above configuration, in addition to the effects obtained by the radial foil bearing 3 of the first embodiment, since the machining of a second engagement recess 35 is unnecessary, the machining of the bearing housing 42 can become further easy.

In addition, since the intermediate foil 41 is composed not of three intermediate foil pieces but of six intermediate foil pieces 41a, the restraint area due to friction described above is further decreased, a slide further easily occur between each intermediate foil piece 41a and a back foil 11 or between each intermediate foil piece 41a and the top foil 9, and thus the dumping effect using friction can be improved.

Furthermore, the back foil piece 11a can be fixed to the bearing housing 42 using the intermediate foil piece 41a.

Third Embodiment

Figure 11A:
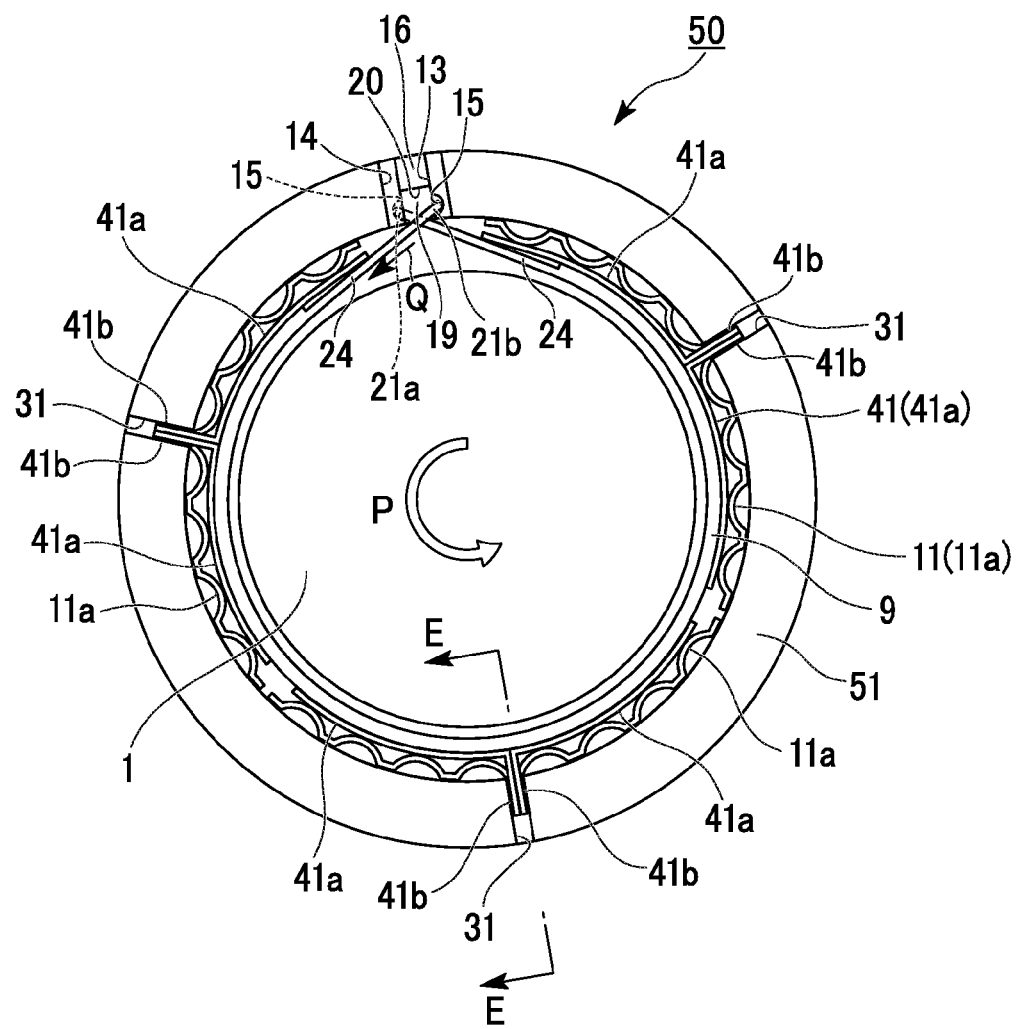
FIG. 11A is a side view of a radial foil bearing of a third embodiment of the present invention.

Next, a third embodiment of a radial foil bearing of the present invention is described. FIGS. 11A, 11B, 12A and 12B are views showing the third embodiment of the radial foil bearing provided in the turbo machine shown in FIG. 1. In FIG. 11A, a reference numeral 50 represents a radial foil bearing. The radial foil bearing 50 is different from the radial foil bearing 40 shown in FIG. 9A, in that a locking member 30 is not provided therein, and a back foil piece 11a is fixed to a bearing housing 51 using intermediate foil pieces 41a.

Figure 11B:
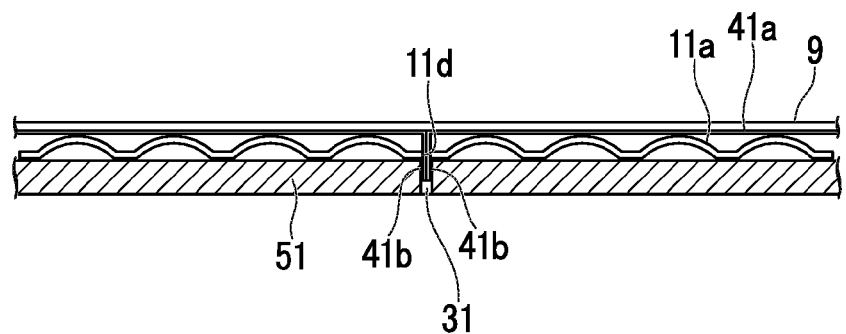
FIG. 11B is a side view in which a main section of FIG. 11A is flattened and is schematically shown.
Figure 12A:
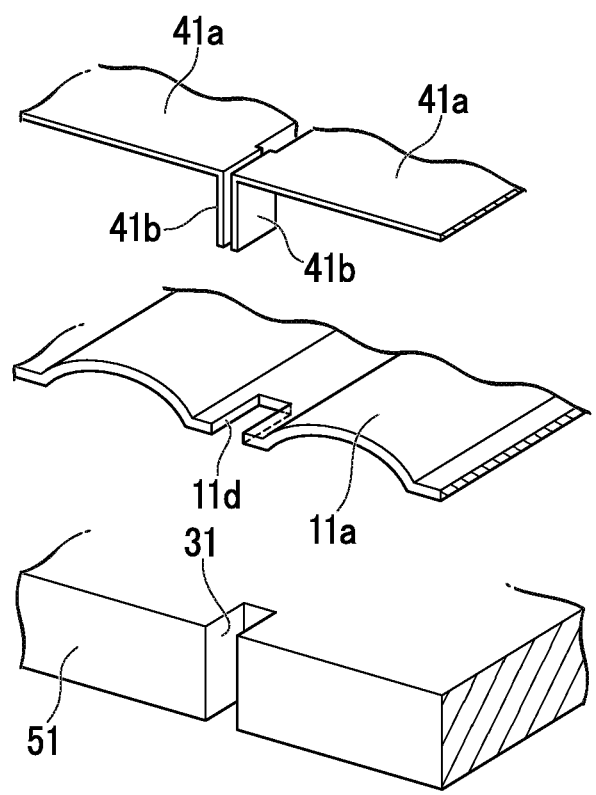
FIG. 12A is an exploded perspective view of a main section of the radial foil bearing shown in FIG. 11A.
Figure 12B:
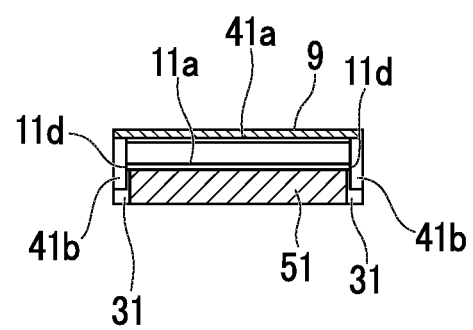
FIG. 12B is a cross-sectional view taken along E-E line in FIG. 11A.

That is, in this embodiment, a groove 32 shown in the first and second embodiments, in which a locking member 30 is locked, is not formed in the bearing housing 51, and only first engagement recesses 31 are formed therein. As shown in FIG. 11B, engagement-projecting pieces 41b of the intermediate foil pieces 41a engage with the first engagement recess 31 through an engagement notch 11d of the back foil piece 11a. As shown in FIG. 12A, a pair of intermediate foil pieces 41a being next to each other in the circumferential direction of the bearing housing 51 are disposed so that the engagement-projecting pieces 41b of the intermediate foil pieces 41a face each other, and the engagement-projecting pieces 41b are engaged with the first engagement recess 31 through the engagement notch 11d. In this case, in this embodiment, since a locking member 30 is not provided, as shown in FIG. 11B, only a pair of engagement-projecting pieces 41b are engaged with a first engagement recess 31.

Figure 13:
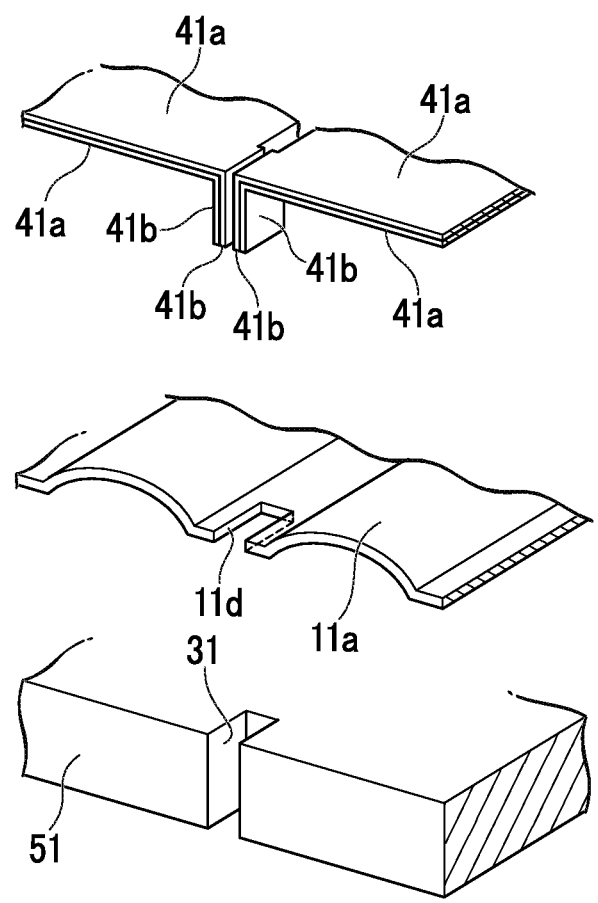
FIG. 13 is an exploded perspective view showing a main section of a modification of the radial foil bearing of the third embodiment.

Therefore, in this embodiment, as shown in FIG. 12A, the first engagement recess 31 is formed so that the width thereof (the width in the circumferential direction of the bearing housing 51) is less than that of the first engagement recess 31 shown in the second embodiment. Specifically, the width of the first engagement recess 31 of this embodiment is set to approximately twice the thickness b of the engagement-projecting piece 41b of the intermediate foil piece 41a. In addition, it is preferable that the width of the engagement notch 11d of the back foil piece 11a be also set to approximately twice the thickness b of the engagement-projecting piece 41b. Furthermore, in general, the thickness b of the engagement-projecting piece 41b is 0.1 mm or less and is extremely small, and accordingly, it is necessary to also set the width of the first engagement recess 31 to 0.2 mm or less. However, in the present circumstances, it is difficult to perform machining of a recess having such a small width, and since it is necessary to use, for example, laser machining, the machining cost thereof may increase. Thus, in this embodiment, as shown in FIG. 13, it is preferable that a plurality of intermediate foil pieces 41a (two layers in FIG. 13) be used so as to be disposed overlapping with each other, to be multi-layered. If forming a multi-layered structure in this way, the engagement-projecting pieces 41b are also disposed overlapping with each other, thereby increasing the whole thickness thereof, and thereby the width of the first engagement recess 31 can be increased. Consequently, the machining of the first engagement recess 31 becomes easy, and the machining cost thereof can be suppressed to be low.

In the radial foil bearing 50 having the above configuration, in addition to the effects obtained by the radial foil bearing 40 of the second embodiment, effects can be obtained that the number of parts or the assembly steps are decreased because a locking member 30 is unnecessary, and the machining of a groove 32 is unnecessary, whereby the production cost thereof can be significantly decreased.

The present invention is not limited to the above embodiments and is limited only by the scopes of the attached claims. The shape, the combination or the like of each component shown in the above-described embodiments is an example, and additions, omissions, replacements, and other modifications of configurations based on design requests or the like can be adopted within the scope of and not departing from the gist of the present invention.

For example, in the first and second embodiments, an intermediate foil composed of intermediate foil pieces is used in a state of one sheet (one layer). However, as shown in FIG. 13, a plurality of intermediate foils (intermediate foil pieces) may be disposed overlapping with each other, to be multi-layered. In this way, by disposing the multi-layered intermediate foils between a back foil and a top foil, the damping effect obtained by friction caused by a slide between the intermediate foils is added to the damping effect obtained by friction caused by a slide between the top foil and the intermediate foil or between the intermediate foil and the back foil. Thus, it is possible to suppress the shaft vibration (self-excited vibration) of a rotary shaft and to easily settle the shaft vibration.

In order to improve the damping effect of a radial foil bearing, as described above, the adoption of multi-layered intermediate foils is effective. However, in the related art, since an intermediate foil is spot-welded on a bearing housing, it is necessary to control the thickness of the intermediate foil so as to prevent melt of the intermediate foil through the welding, and thus the thickness of the intermediate foil is set to be approximately equivalent to that of a top foil. Therefore, if intermediate foils having such a thickness are disposed overlapping with each other, to be multi-layered, the rigidity of a bearing surface (the rigidity obtained by adding up these of the top foil and of the intermediate foils) becomes very high, and thus the bearing surface may not properly receive film pressure variation of a fluid lubrication film caused by shaft vibration. As a result, the damping effect based on a "slide" between foils may not be easily obtained.

In contrast, in the above embodiments, without welding an intermediate foil on a bearing housing, by engaging an engagement-projecting piece thereof with an engagement recess, the intermediate foil is fixed between a back foil and a top foil, and accordingly, the intermediate foil can be formed having a sufficiently less thickness than that of the top foil. Thus, while the rigidity of the bearing surface is suppressed to be an appropriate level (strength), a multi-layered structure of intermediate foils can be adopted.

In the first and second embodiments, an engagement projection 33a to be engaged with an engagement notch 11d of a back foil piece 11a is formed using an engagement arm 33 of a locking member 30. On the other hand, an engagement projection 33a may be directly formed on the inner circumferential surface of a bearing housing 12. In this case, particularly in the second embodiment, it is sufficient to form groove-like engagement recesses at both sides (both sides in the circumferential direction) of the engagement projection 33a directly formed on the inner circumferential surface of the bearing housing 12, wherein the groove-like engagement recesses allow engagement-projecting pieces 41b of intermediate foil pieces 41a to be engaged therewith.

In the above embodiments, by fitting a fixing member 16 into a through groove 13, engagement grooves 20, with which projecting portions 21a and 21b of a top foil 9 are engaged, are formed. However, instead of the through groove 13, engagement grooves with which the projecting portions 21a and 21b are engaged may be directly formed in a bearing housing 12.

In the above embodiments, a bearing housing is formed in a cylindrical shape. However, an annular flange may be integrally formed on one side surface or on each of both side surfaces of a bearing housing, and the whole shape of the bearing housing may be formed in an approximately cylindrical shape. By forming the flange, the bearing housing can be easily attached to the housing of a turbo machine or the like.

INDUSTRIAL APPLICABILITY

The present invention can be applied to a radial foil bearing which supports a rotary shaft so as to encircle the rotary shaft.

The invention claimed is:
1. A radial foil bearing used for supporting a rotary shaft so as to encircle the rotary shaft, the radial foil bearing comprising:
a cylindrical top foil disposed so as to face the rotary shaft;
an intermediate foil disposed outside of the top foil in a radial direction thereof;
a back foil disposed outside of the intermediate foil in the radial direction; and
a cylindrical bearing housing accommodating the top foil, the intermediate foil and the back foil,
wherein a plurality of pairs of engagement recesses are formed in the bearing housing, each pair of engagement recesses are positioned on both side surfaces of the bearing housing so as to be opposite to each other, each engagement recess extends from an inner circumferential surface toward an outer circumferential surface of the bearing housing, and the plurality of pairs of engagement recesses are disposed in a circumferential direction of the bearing housing,
wherein the intermediate foil includes intermediate foil pieces disposed in the circumferential direction of the bearing housing,
wherein an engagement-projecting piece engaging with the engagement recess is formed in each intermediate foil piece,
wherein an engagement notch communicating with the engagement recess is formed on each of both side edges of the back foil, and wherein the engagement-projecting piece of the intermediate foil piece engages with the engagement recess through the engagement notch of the back foil.

2. The radial foil bearing according to claim 1, wherein an engagement groove is formed in the inner circumferential surface of the bearing housing between the engagement recesses opposite to each other, the engagement groove communicates with each of the engagement recesses, and a depth of the engagement groove toward the outer circumferential surface of the bearing housing is less than that of the engagement recess,
a locking member is locked in the engagement recesses and in the engagement groove,
the locking member includes a pair of engagement arms engaging with the engagement recesses, and a connection portion engaging with the engagement groove and connecting the pair of engagement arms,
engagement projections are provided in portions of the pair of engagement arms opposite to portions thereof engaging with the engagement recesses, and each engagement projection projects-inward relative to the inner circumferential surface of the bearing housing.

3. The radial foil bearing according to claim 2, wherein each of the intermediate foil pieces includes at least two foils overlapping with each other.

4. The radial foil bearing according to claim 2, wherein the back foil includes back foil pieces disposed in the circumferential direction of the bearing housing, and
the engagement notch is formed in each back foil piece.

5. The radial foil bearing according to claim 4, wherein each of the intermediate-foil pieces includes at least two foils overlapping with each other.

6. The radial foil bearing according to claim 4, wherein the engagement notch of the back foil piece is formed in a circumferentially center portion of the back foil piece.

7. The radial foil bearing according to claim 6, wherein each of the intermediate foil pieces includes at least two foils overlapping with each other.

8. The radial foil bearing according to claim 1, wherein each of the intermediate-foil pieces includes at least two foils overlapping with each other.

9. A radial foil bearing used for supporting a rotary shaft so as to encircle the rotary shaft, the radial foil bearing comprising:
a cylindrical top foil disposed so as to face the rotary shaft;
an intermediate foil disposed outside of the top foil in a radial direction thereof;
a back foil disposed outside of the intermediate foil in the radial direction; and
a cylindrical bearing housing accommodating the top foil, the intermediate foil and the back foil,
wherein two ends of the top foil in a circumferential direction thereof engage with the bearing housing,
wherein a plurality of pairs of engagement recesses are formed in the bearing housing, each pair of engagement recesses are positioned on both side surfaces of the bearing housing so as to be opposite to each other, each engagement recess extends from an inner circumferential surface toward an outer circumferential surface of the bearing housing, and the plurality of pairs of engagement recesses are disposed in a circumferential direction of the bearing housing,
wherein the intermediate foil includes intermediate foil pieces disposed in the circumferential direction of the bearing housing, and
wherein an engagement-projecting piece engaging with the engagement recess is formed in each intermediate foil piece.

10. A radial foil bearing used for supporting a rotary shaft so as to encircle the rotary shaft, the radial foil bearing comprising:
a cylindrical top foil disposed so as to face the rotary shaft;
an intermediate foil disposed outside of the top foil in a radial direction thereof;
a back foil disposed outside of the intermediate foil in the radial direction;
a cylindrical bearing housing accommodating the top foil, the intermediate foil and the back foil, an inner circumferential surface of the bearing housing being provided with a groove reaching each of two side surfaces of the bearing housing in an axial direction of the bearing housing; and
a locking member locked in the groove,
wherein two ends of the top foil in a circumferential direction thereof engage with the bearing housing,
wherein the locking member is provided with an engagement projection projecting inward relative to the inner circumferential surface of the bearing housing,
wherein the intermediate foil includes intermediate foil pieces,
wherein each of the intermediate foil pieces is provided with an engagement-projecting piece,
wherein the back foil engages with the engagement projection, and
wherein the engagement-projecting piece engages with an engagement part of the back foil with which the engagement projection engages.

* * * * *